US012717750B2

(12) United States Patent
Park et al.

(10) Patent No.: US 12,717,750 B2
(45) Date of Patent: Aug. 25, 2026

(54) UNIVERSAL SERIAL BUS INTERFACE CIRCUIT, ELECTRONIC DEVICE INCLUDING THE SAME, AND OPERATING METHOD THEREOF

(71) Applicant: SAMSUNG ELECTRONICS CO., LTD., Suwon-si (KR)

(72) Inventors: Youngwoo Park, Suwon-si (KR); Sungkyu Cho, Suwon-si (KR); Sunhwan Kwon, Suwon-si (KR); Sungha Park, Suwon-si (KR); Jinsu Park, Suwon-si (KR); Junchul Shin, Suwon-si (KR); Taesun You, Suwon-si (KR); Sungwoo Lee, Suwon-si (KR); Yonghwan Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/012,519

(22) Filed: Jan. 7, 2025

(65) Prior Publication Data

US 2026/0010509 A1 Jan. 8, 2026

(30) Foreign Application Priority Data

Jul. 3, 2024 (KR) ........................ 10-2024-0087815

(51) Int. Cl.
*G06F 13/42* (2006.01)
*G06F 13/38* (2006.01)

(52) U.S. Cl.
CPC ........ *G06F 13/4282* (2013.01); *G06F 13/382* (2013.01); *G06F 2213/0042* (2013.01)

(58) Field of Classification Search
CPC ............... G06F 13/4282; G06F 13/382; G06F 2213/0042
See application file for complete search history.

(56) References Cited

U.S. PATENT DOCUMENTS

| | | | |
|---|---|---|---|
| 9,891,684 | B2 | 2/2018 | Liu et al. |
| 10,148,084 | B2 | 12/2018 | Forghani-Zadeh et al. |

(Continued)

FOREIGN PATENT DOCUMENTS

| | | | |
|---|---|---|---|
| CN | 206363301 | U | 7/2017 |
| CN | 108763030 | A | 11/2018 |
| KR | 10-2628011 | | 1/2024 |

OTHER PUBLICATIONS

Extended European Search Report in European Appln. No. 25170571.1, mailed on Oct. 2, 2025, 10 pages.

*Primary Examiner* — Henry Tsai
*Assistant Examiner* — Harry Z Wang
(74) *Attorney, Agent, or Firm* — Fish & Richardson P.C.

(57) ABSTRACT

A universal serial bus (USB) interface circuit, an electronic device including the USB interface circuit, and an operating method of the electronic device are disclosed. The electronic device includes a connector including a plurality of pins, a wake-up circuit that generates a pre-dual role port (DRP) signal based on a first internal clock signal in response to a first enable signal and generates a wake-up signal based on a configuration channel (CC) signal generated at one or more CC pins of the connector, the first enable signal, the pre-DRP signal, and the first internal clock signal, a USB circuit that generates the first enable signal while the connector and an external connector are disconnected from each other and generates a second enable signal in response to the wake-up signal, and an overvoltage protection circuit that is activated in response to a second enable signal.

20 Claims, 12 Drawing Sheets

(56) References Cited

U.S. PATENT DOCUMENTS

| | | | | |
|---|---|---|---|---|
| 10,261,557 | B2 | 4/2019 | Kim | |
| 10,678,556 | B2 | 6/2020 | Jang et al. | |
| 10,817,450 | B1 | 10/2020 | Wei | |
| 11,100,034 | B1 | 8/2021 | Vispuite et al. | |
| 11,862,964 | B2 | 1/2024 | Kim | |
| 2017/0155214 | A1 | 6/2017 | Shen et al. | |
| 2017/0262035 | A1* | 9/2017 | Agarwal | G06F 1/3296 |
| 2018/0011528 | A1* | 1/2018 | Srivastava | G06F 13/4282 |
| 2018/0060261 | A1* | 3/2018 | Chhor | G06F 13/4282 |
| 2019/0220288 | A1* | 7/2019 | Jang | G06F 1/3287 |
| 2021/0083504 | A1* | 3/2021 | Ning | H02J 7/63 |
| 2023/0161723 | A1* | 5/2023 | Kasichainula | G06F 1/266 710/105 |
| 2023/0385218 | A1* | 11/2023 | Natarajan | G06F 13/382 |

* cited by examiner

Figure 1:
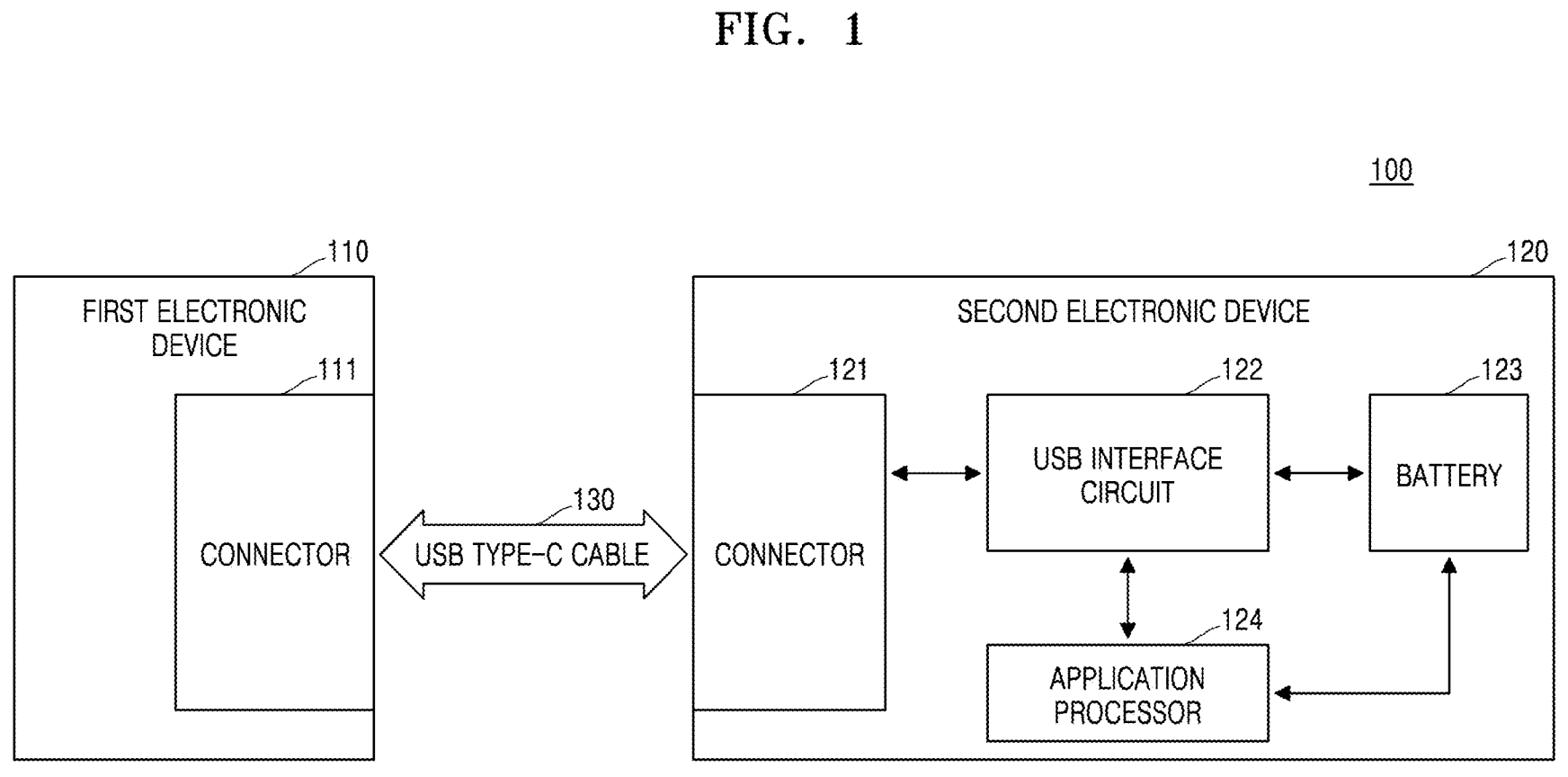

120 SECOND ELECTRONIC DEVICE

121 CONNECTOR

122 USB INTERFACE CIRCUIT

123 BATTERY

124 APPLICATION PROCESSOR

130 USB TYPE-C CABLE

110 FIRST ELECTRONIC DEVICE

111 CONNECTOR

FIG. 3

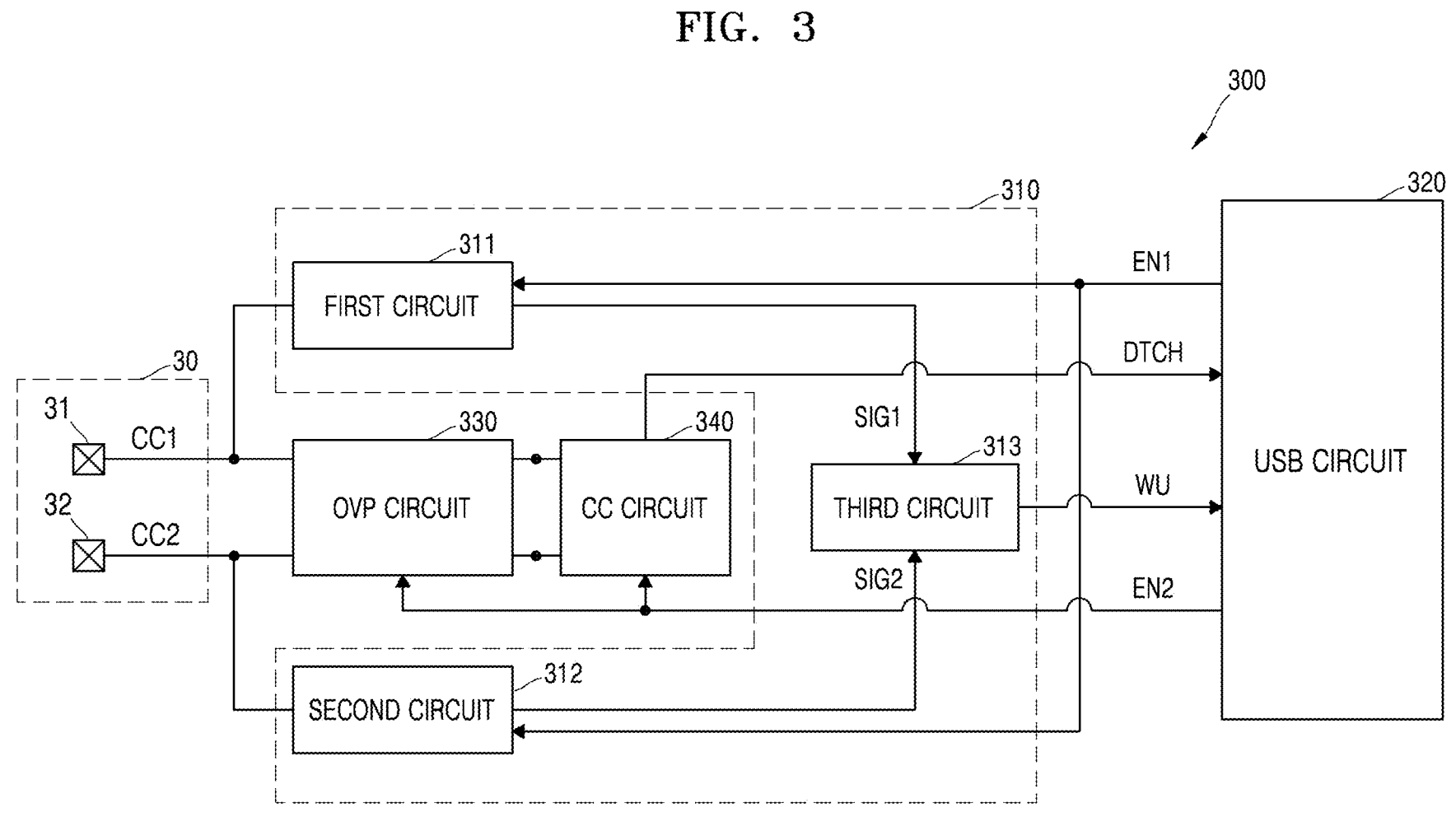

300
320
USB CIRCUIT
EN1
DTCH
WU
EN2
310
313
THIRD CIRCUIT
SIG1
SIG2
340
CC CIRCUIT
311
FIRST CIRCUIT
330
OVP CIRCUIT
312
SECOND CIRCUIT
30
CC1
CC2
31
32

Figure 4:
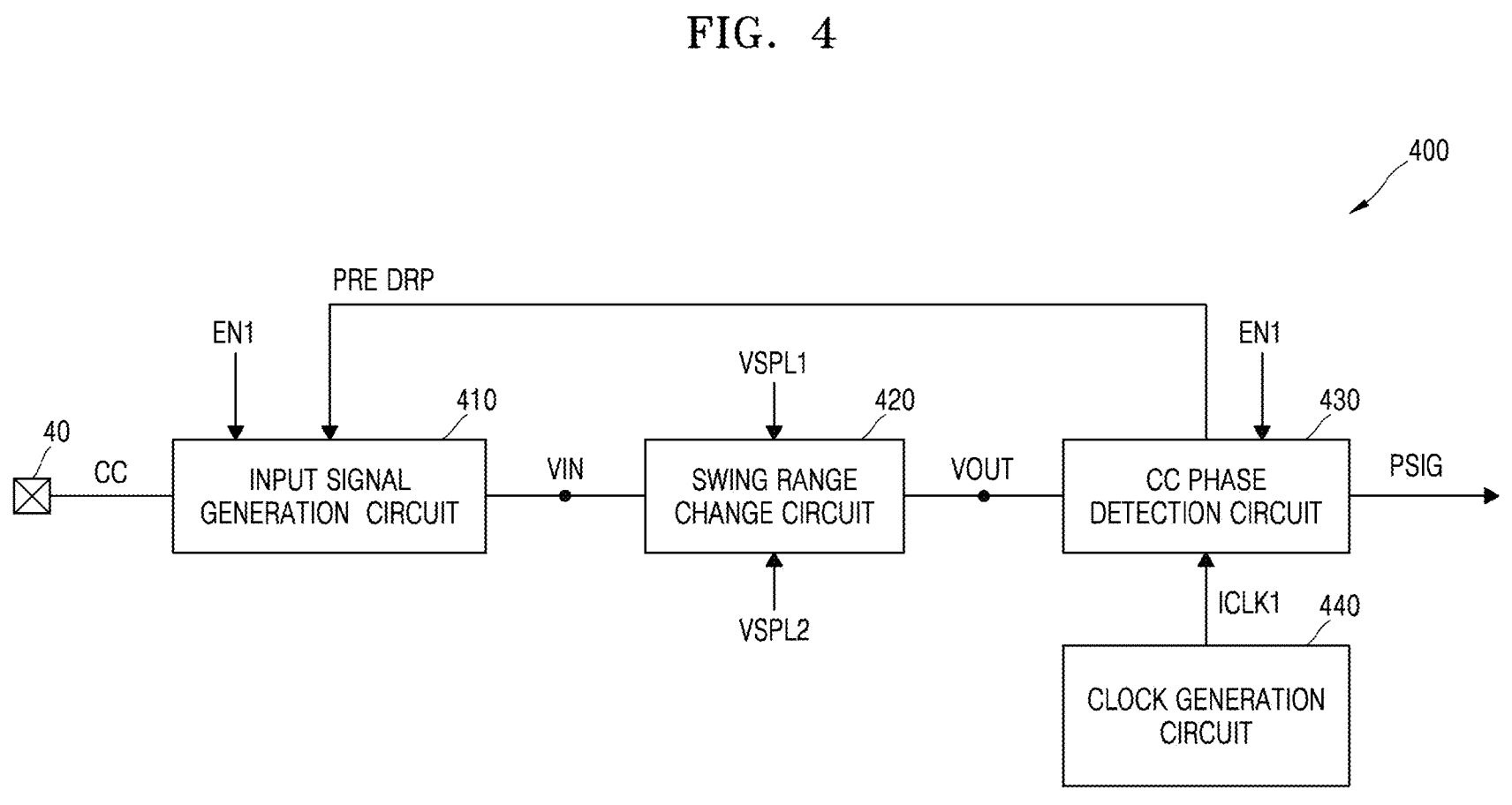

PRE DRP

410

INPUT SIGNAL GENERATION CIRCUIT

VIN

420

VSPL1

SWING RANGE CHANGE CIRCUIT

VSPL2

VOUT

430

EN1

CC PHASE DETECTION CIRCUIT

ICLK1

440

CLOCK GENERATION CIRCUIT

PSIG

FIG. 9

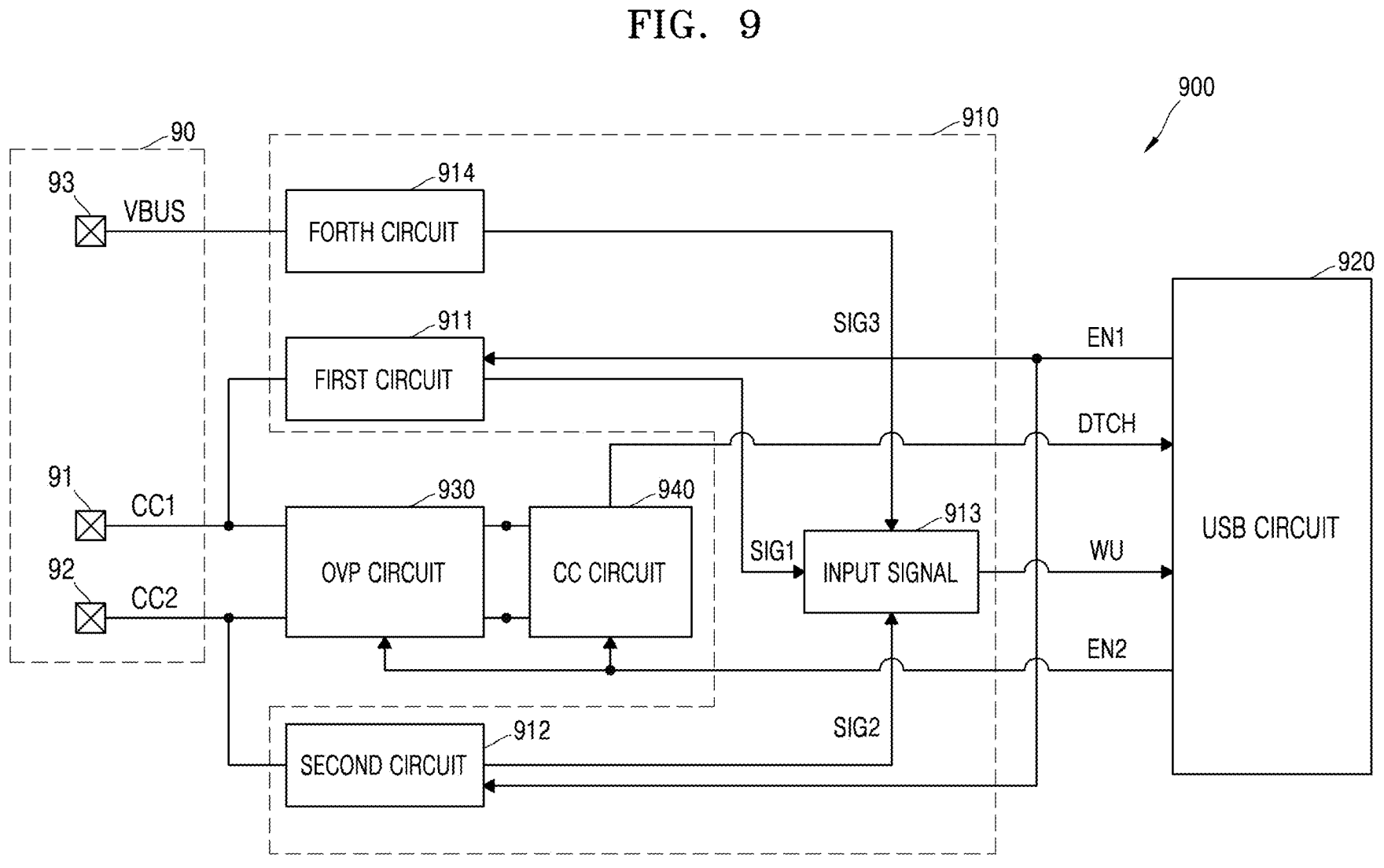

900
920 USB CIRCUIT
EN1
DTCH
WU
EN2
910
913 INPUT SIGNAL
SIG3
SIG2
SIG1
940 CC CIRCUIT
914 FORTH CIRCUIT
911 FIRST CIRCUIT
930 OVP CIRCUIT
912 SECOND CIRCUIT
90
VBUS
CC1
CC2
93
91
92

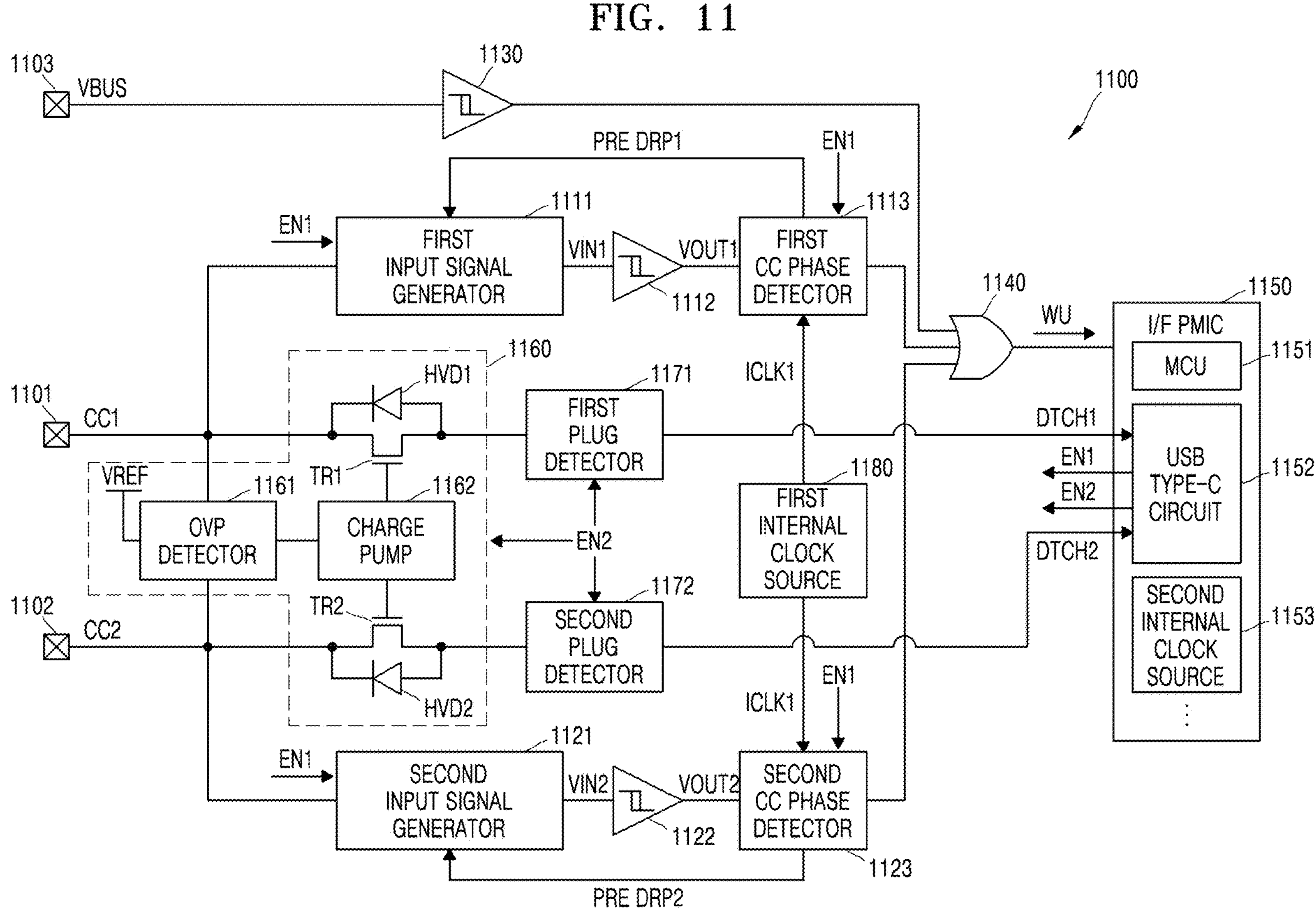
FIG. 11
1100
1103
VBUS
1130
PRE DRP1
EN1
1111
EN1
FIRST INPUT SIGNAL GENERATOR
VIN1
VOUT1
1112
1113
FIRST CC PHASE DETECTOR
1140
WU
1150
I/F PMIC
MCU
1151
1160
HVD1
1171
ICLK1
1101
CC1
FIRST PLUG DETECTOR
DTCH1
USB TYPE-C CIRCUIT
1152
EN1
EN2
VREF
1161
TR1
1162
1180
OVP DETECTOR
CHARGE PUMP
EN2
FIRST INTERNAL CLOCK SOURCE
DTCH2
1102
CC2
TR2
1172
SECOND PLUG DETECTOR
SECOND INTERNAL CLOCK SOURCE
1153
HVD2
EN1
ICLK1
...
1121
EN1
SECOND INPUT SIGNAL GENERATOR
VIN2
VOUT2
1122
SECOND CC PHASE DETECTOR
1123
PRE DRP2

UNIVERSAL SERIAL BUS INTERFACE CIRCUIT, ELECTRONIC DEVICE INCLUDING THE SAME, AND OPERATING METHOD THEREOF

CROSS-REFERENCE TO RELATED APPLICATION

This application is based on and claims priority under 35 U.S.C. § 119 to Korean Patent Application No. 10-2024-0087815, filed on Jul. 3, 2024, in the Korean Intellectual Property Office, the disclosure of which is incorporated by reference herein in its entirety.

BACKGROUND

Electronic devices may communicate through a variety of interface standards. Electronic devices may communicate via interfaces such as, for example, USB Type-C or universal serial bus power delivery (USB PD) Type-C interfaces. The USB Type-C interface standard allows users to connect devices to a host system in any direction. Electronic devices connected to each other via a USB protocol may transmit and receive data and may receive power from an electronic device that corresponds to a source.

When an electronic device receives power via a USB protocol, particularly in USB PD, a high voltage of about 20 V or more may be applied to the electronic device. The electronic device may include an overvoltage protection circuit blocking the high voltage to protect internal circuits of the electronic device. However, because the overvoltage protection circuit operates while the electronic device is disconnected, the overvoltage protection circuit consumes the charging voltage of an internal battery of the electronic device, and thus, unnecessary power consumption may occur.

SUMMARY

The present disclosure provides a universal serial bus (USB) interface circuit for reducing power consumption while waiting to be connected to an external electronic device via a USB cable, an electronic device including the USB interface circuit, and an operating method of the electronic device.

According to an aspect of the present disclosure, an electronic device is provided including a connector connected to an external connector of an external electronic device, the connector comprising a plurality of pins, a wake-up circuit connected to configuration channel (CC) pins of the plurality of pins, the wake-up circuit being configured to in response to a first enable signal, generate a pre-dual role port (DRP) signal based on a first internal clock signal that is toggled independent of an operating state of the electronic device and to generate a wake-up signal based on a CC signal generated at one or more CC pins among the CC pins, the first enable signal, the pre-DRP signal, and the first internal clock signal, a universal serial bus (USB) circuit configured to generate the first enable signal while the connector and the external connector are disconnected from each other and to generate a second enable signal in response to the wake-up signal, and an overvoltage protection circuit connected to the CC pins, the overvoltage protection circuit being configured to enter an activation state from a deactivation state in response to the second enable signal and to perform an overvoltage protection operation for restricting overvoltage at the one or more CC pins in the activation state.

According to another aspect of the present disclosure, an operating method of an electronic device including a universal serial bus (USB) Type-C connector is provided, the operating method including generating a first enable signal having a first enable level based on a state in which an external USB Type-C connector of an external electronic device and the USB Type-C connector are disconnected from each other, generating a pre-dual role port (DRP) signal based on a first internal clock signal that toggles independent of an operating state of the electronic device in response to the first enable level of the first enable signal, generating a wake-up signal indicating a connection between the external USB Type-C connector and the USB Type-C connector based on a configuration channel (CC) signal generated at a CC pin of the USB Type-C connector, the first enable signal, and the pre-DRP signal, generating a second enable signal having a second enable level in response to the wake-up signal, and activating an overvoltage protection operation for restricting overvoltage at the CC pin in response to the second enable level of the second enable signal.

According to another aspect of the present disclosure, a universal serial bus (USB) interface circuit is provided that is connected to a bus voltage pin, a first configuration channel (CC) pin, and a second CC pin of a USB Type-C connector, the USB interface circuit including a wake-up circuit configured to generate a pre-dual role port (DRP) signal based on a first internal clock signal that toggles independent of a connection state between the USB Type-C connector and an external USB Type-C connector in response to a first enable signal and to generate a wake-up signal based on a CC signal generated at one or more CC pins of the first CC pin and the second CC pin, the first enable signal, the pre-DRP signal, and the first internal clock signal, an overvoltage protection circuit configured to be activated in response to a second enable signal and to perform an overvoltage protection operation for restricting overvoltage at the one or more CC pins, a CC circuit configured to be activated in response to the second enable signal and to identify a situation related to a connection of the USB Type-C connector based on the CC signal, and a USB circuit configured to generate the first enable signal based on a state in which the USB Type-C connector and the external USB Type-C connector are disconnected from each other, to generate a second enable signal in response to the wake-up signal, and to charge a battery based on a situation related to a connection of the USB Type-C connector.

BRIEF DESCRIPTION OF THE DRAWINGS

Implementations will be more clearly understood from the following detailed description taken in conjunction with the accompanying drawings in which:

FIG. 1 is a block diagram of a system;

FIG. 3 is a block diagram showing an example of a universal serial bus (USB) interface circuit;

FIG. 4 is a block diagram showing an example of a circuit connected to a configuration channel (CC) pin;

FIG. 9 is a block diagram showing another example of a USB interface circuit;

FIG. 11 is a block diagram showing another example of a USB interface circuit.

DETAILED DESCRIPTION

Figure 2:
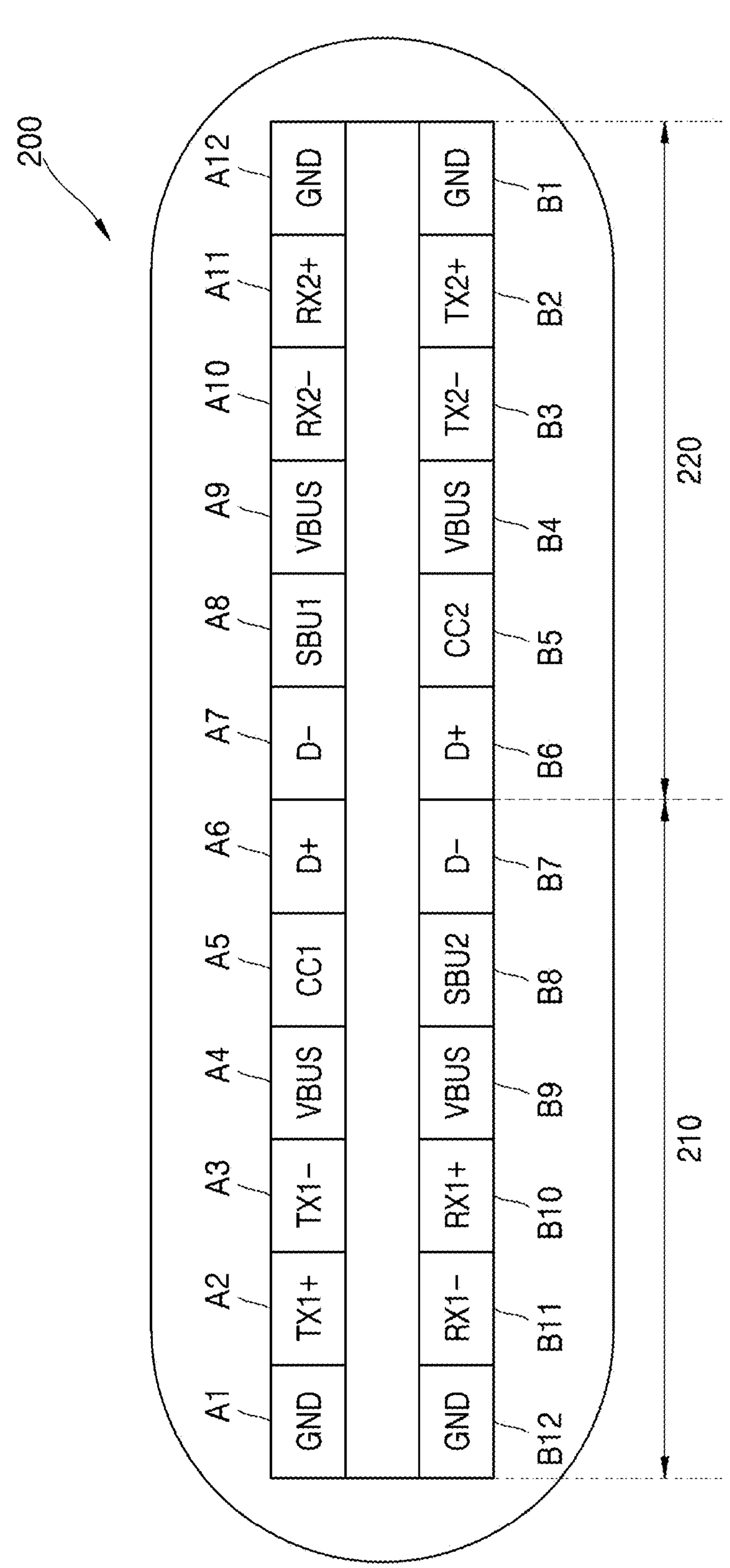
FIG. 2 is a diagram showing a connector.

Hereinafter, implementations of the disclosure will be described in detail with reference to the attached drawings.

The expressions "first,", "second," etc., used in the present specification may describe various components, regardless of order and/or importance, and are only used to distinguish one component from other components and do not limit the components. For example, a first user device and a second user device may represent different user devices, regardless of order or importance. For example, without departing from the scope of the rights set forth herein, a first component may be referred to as a second component, and similarly, a second component may be referred to as a first component.

When it is described that a component (e.g., a first component) is "(operatively or communicatively) coupled with/to" or "connected to" another component (e.g., a second component), it should be understood that the component may be directly coupled to the other component, or may be connected to the other component through another component (e.g., a third component). On the other hand, when it is described that a component (e.g., a first component) is "directly coupled" or "directly connected" to another component (e.g., a second component), it may be understood that no other component (e.g., a third component) exists between the component and the other component.

FIG. 1 is a block diagram of a system 100 according to some implementations. Referring to FIG. 1, the system 100 may include a first electronic device 110, a second electronic device 120, and a universal serial bus (USB) Type-C cable 130.

An electronic device of the disclosure may include a smartphone, a tablet personal computer (PC), a mobile phone, an e-book reader, a desktop PC, a laptop PC, a netbook computer, a personal digital assistant (PDA), a portable multimedia player (PMP), an MP3 player, a mobile medical device, a camera, a wearable device, or a home appliance. The wearable device according to implementations may include an accessory (e.g., a watch, a ring, a bracelet, an anklet, a necklace, glasses, contact lenses, or a head-mounted device (HMD)), a fabric or clothing-integrated device (e.g., electronic clothing), a body-attached device (e.g., a skin pad or a tattoo), or a bio-implantable device (e.g., an implantable circuit). The home appliance according to implementations may include, for example, a television, a digital video disk (DVD) player, an audio, a refrigerator, an air conditioner, a vacuum cleaner, an oven, a microwave oven, a washing machine, an air purifier, or a set-top box.

The first electronic device 110 and the second electronic device 120 may be devices capable of communicating with each other via a USB interface. The USB interface may support versions, such as USB 3.2 and USB4, support terminal types, such as Type-C, and support USB bus power, such as USB battery charging (BC) or USB power delivery (PD). The first electronic device 110, the second electronic device 120, and the USB Type-C cable 130 may each be equipped with an interface that supports the USB PD.

The first electronic device 110 and the second electronic device 120 may each include a connector 111 or 121, and the connectors 111 and 121 may be connected to connectors provided at both ends of the USB Type-C cable 130. In some implementations, the connectors 111 and 121 are USB Type-C based connectors. In some implementations, the connectors 111 and 121 may be lightning connectors or thunderbolt connectors. For example, the connector 111 may supply power and/or signals to the connector 112. As the connectors 111 and 121 are connected to the USB Type-C cable 130, the first electronic device 110 and the second electronic device 120 may be electrically connected to each other. When the first electronic device 110 and the second electronic device 120 are separated (i.e., disconnected) from each other, the second electronic device 120 may be in a sleep state. In the sleep state, the second electronic device 120 may wait until receiving an input from a user, an input from the outside, and the like while consuming a voltage charged in a battery 123 at a minimum. When the first electronic device 110 and the second electronic device 120 are electrically connected to each other, the second electronic device 120 may be in a non-sleep state or an operating state. In the non-sleep slip state, the second electronic device 120 may transmit or receive data to or from the first electronic device 110, or may charge the battery 123 by using a supply voltage supplied from the first electronic device 110.

In some implementations, the second electronic device 120 include the connector 121, a USB interface circuit 122, the battery 123, and an application processor 124. Although not shown in the drawings, the second electronic device 120 may further include memory or the like.

The connector 121 may be connected to a connector of the USB Type-C cable 130. The connector 121 may include a plurality of pins. The plurality of pins of the connector 121 are described below with reference to FIG. 2.

The USB interface circuit 122 may be connected to the connector 121. The USB interface circuit 122 may transfer data provided from the first electronic device 110 to the application processor 124, or may transfer data provided from the application processor 124 to the first electronic device 110 through the connector 121 and the USB Type-C cable 130. The USB interface circuit 122 may charge the battery 123 with a supply voltage (or supply current) supplied from the first electronic device 110.

In some implementations, instead of the USB interface circuit 122, a lightning interface circuit or a thunderbolt interface circuit capable of performing the operation of the USB interface circuit 122 is included in the second electronic device 120.

The battery 123 may charge a supply voltage (or supply current) supplied through the USB interface circuit 122. The battery 123 may provide the charged voltage to the USB interface circuit 122 and/or the application processor 124.

The application processor 124 may control all operations of the second electronic device 120. The application processor 124 may perform calculations or data processing related to control and/or communication of each component of the second electronic device 120.

The USB Type-C cable 130 may electrically connect the first electronic device 110 to the second electronic device 120.

Although not shown in the drawings, the second electronic device 120 may include a memory. The memory may store one or more programs and data related to executing functions, such as USB interface-based connection, device identification, data communication, or charging of the second electronic device 120. The memory may store instructions, such as control commands for various arithmetic and logical operations, data movement, and data input/output that may be performed by the application processor 124.

According to the implementations described above, an electronic device supporting a USB interface may have an effect of reducing battery power consumption by deactivating disabling an overvoltage protection circuit when an external electronic device is disconnected from the electronic device supporting a USB interface.

In addition, the electronic device supporting a USB interface may ensure the reliability of the electronic device by toggling a signal for recognizing a USB protocol even when an external electronic device is disconnected from the electronic device supporting a USB interface.

FIG. 2 is a diagram showing a connector 200 according to some implementations. Referring to FIG. 2, the connector 200 may be divided into a first part 210 and a second part 220. The first part 210 and the second part 220 may be symmetrical to each other. The connector 200 having a symmetrical structure may be connected to an external connector regardless of the directionality of the connector 200 when the connector 200 is connected to a USB cable or gender. For example, the connectors at both ends of a USB cable may have the same shape (form) and have no front or back distinction, and thus, the connectors may be immediately connected without having to match the pin orientation of the connectors. The connection state of the connector 200 may be detected through configuration channel (CC) pins A5 and B8. When a pull-down (e.g., Rd=5.1 kΩ) is detected at a first CC pin or CC1 pin A5 of the connector 200, the first part 210 may be in a plugged state, and when a pull-down is detected at a second CC pin or CC2 pin B5 of the connector 200, the second part 220 may be in a plugged state. For example, a host may provide a pull-up current to the CC pins A5 and B5 and then observe whether a pull-down occurs at the CC pins A5 and B5 to determine whether a device is connected, and the device may observe whether a pull-up occurs at the CC pins A5 and B5. Before the host and the device are connected to each other via a cable, a pull-up current is supplied to one CC pin (e.g., the CC1 pin A5) of the host, and one CC pin (e.g., the CC1 pin A5) of the device is connected to the ground through a pull-down resistor Rd. When the host and the device are connected to each other via a cable, the current supplied to the CC1 pin A5 of the host is transferred to the CC1 pin A5 of the device via the cable, and then flows to the ground through the pull-down resistor Rd connected to the CC1 pin A5 of the device.

The connector 200 may include a total of 24 pins A1 to A12 and B1 to B12, and each of the 24 pins may have a certain role, as illustrated in FIG. 2. For example, the connector 200 may include four ground (GND) pins A1, A12, B1, and B12, four cable bus power pins or bus voltage pins A4, A9, B4, and B9 for supplying power, pins A6 and B7 or A7 and B6 for supporting USB 2.0 protocol, four pairs of data bus pins A2, A3, A10, A11, B2, B3, B10, and B11 for providing high-speed data paths, such as USB3.x or USB4, two sideband use pins A8 and B8, and two CC pins A5 and B5 for cable detection.

The connector 200 may support data communication at different transmission speeds. For example, the connector 200 may include a first communication path according to a first standard (e.g., USB 3.x or USB4) that supports high-speed data communication, and a second communication path corresponding to a second standard (e.g., USB 2.0) that supports low-speed data communication. For example, the first communication path may include a pair consisting of a TX1+ pin A2, a TX1− pin A3, an RX1+ pin B11, and an RX1− pin B10, or a pair consisting of an RX2− pin A10, an RX2+ pin A11, a TX2+ pin B2, and a TX2− pin B3. For example, the second communication path may include a pair consisting of D+ pin A6 and D− pin B7, or a pair consisting of a D− pin A7 and a D+ pin B6.

When the first electronic device 110 and the second electronic device 120 are connected to each other via the USB Type-C cable 130, the first electronic device 110 and the second electronic device 120 may operate as a host (e.g., a downstream facing port (DFP)) and a device (or slave) (e.g., an upstream facing port (UFP)), respectively. This may be specified through the CC pins A5 and B5 of the connector 200. For example, in a connection method using the connector 200, CC1 and CC2 signals for connector connection direction recognition and digital data communication are provided, and the roles of DFP and UFP may be defined by pull-up (e.g., Rp) or current sourcing and pull-down (e.g., Rd). In the connector 200, the side with the pull-down may be defined as the UFP, and the DFP may supply power through a power supply pin (e.g., VBUS or VCONN) according to the needs of the UFP. In some implementations, the first electronic device 110 is a USB host and the second electronic device 120 is a USB device. However, the disclosure is not limited to the aforementioned implementations, and the first electronic device 110 may be a USB device and the second electronic device 120 may be a USB host. The USB host is a host computer system equipped with a USB host controller. The USB device may include an auxiliary device or hub that complies with the USB standard.

In addition, the first electronic device 110 and the second electronic device 120 may each operate as a dual role port (DRP) in addition to the DFP and the UFP. The DRP may represent a mode (function) that may adaptively change the role of the DFP or UFP of an electronic device. For example, when a DRP is connected to a DFP, the DRP may be changed to a UFP, and when a DRP is connected to a UFP, the DRP may be changed to a DFP. Also, when two DRPs are connected together, one DRP may operate as a DFP and the other may operate as a UFP. For example, an electronic device, such as a smartphone or a PC, may act as both DFP and UFP and may periodically toggle the pull-up and pull-down for this purpose. In some implementations, the first electronic device 110 may be a source that operates as a DFP and supplies power, such as a charger, and the second electronic device 120 may be a sink that operates as a UFP that performs a DRP and may charge the battery 123 with a current or voltage supplied from a charger. The connector 111 of the first electronic device 110 operating as a DFP may include a pull-up resistor, and the connector 121 of the second electronic device 110 operating as a UFP may include a pull-up resistor. The first electronic device 110 and the second electronic device 120 according to some implementations may support a USB PD protocol, and the USB Type-C cable 130 may support a USB PD interface.

VBUS pins A4, A9, B4, and B9 of the connector 200 may be pins that supply a bus voltage, and power corresponding to each USB standard may be supported. For example, when USB PD is combined with USB Type-C, power capacity of up to 20 volts (V)/5 amperes (A) may be supported. The USB PD protocol may be performed through the CC pins A5 and B5.

When the first electronic device 110 and the second electronic device 120 are designated as a DFP and a UFP, respectively, an electronic device (i.e., the first electronic device 110) operating as a DFP may transmits data to an electronic device (i.e., the second electronic device 120) operating as a UFP, and may transmit data through the first communication path of the first standard designated in two pairs in the connector 200. Alternatively, when the first and second electronic devices 110 and 120 are not compatible with the first standard, data may be transmitted through the second communication path of the second standard designated as one pair. When the first electronic device 110 and the second electronic device 120 are electrically connected to each other and thus an electronic device operating as a DFP transmits data to an electronic device operating as a UFP, data communication may be performed by giving priority to the first communication path of the first standard having a high priority (e.g., fast communication speed).

All CC pins A5 and B5 of a receptacle may be used. For example, among the CC pins A5 and B5 of the receptacle, one CC pin may be used as a CC, and the other CC pin may be used for voltage VCONN. Only one of the CC pins A5 and B5 of a plug may be used. A CC pin not used in the plug may be used for the voltage VCONN. A CC pin of the receptacle connected to a CC pin used as a CC of the plug may be used as a CC. The CC pin of the receptacle connected to the CC pin used for the voltage VCONN of the plug may be adjusted to function as a voltage (VCONN) data mode link (DML). The CC pin used as a CC may be used to detect connection (or attachment) and disconnection (or de-attachment) between a DFP and a UFP and may be used to detect the roles of a host and a device (or a source and a sink).

FIG. 3 is a block diagram showing an example of a USB interface circuit 300 according to some implementations. Referring to FIG. 3, the USB interface circuit 300 may be connected to a USB Type-C connector 30. For example, the USB interface circuit 300 may be connected to a first CC pin 31 and a second CC pin 32 of the USB Type-C connector 30. The USB interface circuit 300 may include a wake-up circuit 310, a USB circuit 320, an overvoltage protection (OVP) circuit 330, and a CC circuit 340.

The wake-up circuit 310 may generate a pre-DRP signal based on a first internal clock signal in response to a first enable signal EN1. The first internal clock signal may be toggled independent of the operating state of an electronic device (e.g., the electronic device 120 in FIG. 1). In other words, the first internal clock signal may be a clock signal that occurs in an always on state. For example, the first internal clock signal may be generated based on a charging voltage of the battery 123 in FIG. 1. In some implementations, when the logic level of the first enable signal EN1 is a first enable level, the wake-up circuit 310 may generate a pre-DRP signal having a frequency less than the frequency of the first internal clock signal, in response to the first enable level of the first enable signal EN1. The pre-DRP signal may be a signal for virtually performing a DRP operation before an electronic device (e.g., the second electronic device 120) is electrically connected to an external electronic device (e.g., the first electronic device 110) via the USB Type-C cable 130. That is, the pre-DRP signal may be a signal corresponding to a CC signal generated from at least one of the first CC pin 31 and the second CC pin 32 in a state in which the electronic device and the external electronic device are disconnected from each other. For example, the pre-DRP signal may correspond to at least one of a first CC signal CC1 of the first CC pin 31 and a second CC signal CC2 of the second CC pin 32. To check whether the USB Type-C connector 30 is connected, the first CC signal CC1 and the second CC signal CC2 have to be periodically toggled. However, because the pre-DRP signal is toggled while the electronic device and the external electronic devices are disconnected from each other, the first CC signal CC1 and the second CC signal CC2 may be toggled while the electronic device and the external electronic device are disconnected from each other. The wake-up circuit 310 may generate a wake-up signal WU based on a CC signal generated from at least one of the first CC pin 31 and the second CC pin 32, the first enable signal EN1, the pre-DRP signal, and the first internal clock signal. The wake-up signal WU may be a signal notifying about a connection between an external USB Type-C connector (e.g., the connector 111 in FIG. 1) of an external electronic device and the USB Type-C connector 30.

In some implementations, the wake-up circuit 310 may include a first circuit 311, a second circuit 312, and a third circuit 313.

The first circuit 311 may be connected to the first CC pin 31. The first circuit 311 may generate a first signal SIG1 based on the first internal clock signal, the first enable signal EN1, and the first CC signal CC1 of the first CC pin 31. The second circuit 312 may be connected to the second CC pin 32. The second circuit 312 may generate a second signal SIG2 based on the first internal clock signal, the first enable signal EN1, and the second CC signal CC2 of the second CC pin 32. In some implementations, because the first CC pin 31 and the second CC pin 32 of the USB Type-C connector 30 are symmetrical to each other, circuit elements included in each of the first circuit 311 and the second circuit 312 have a symmetrical structure. For example, circuit configurations included in the first circuit 311 and circuit configurations included in the second circuit 312 may be identical to each other. The first signal SIG1 and the second signal SIG2 may be pulse signals each having a pulse width.

The third circuit 313 may generate the wake-up signal WU based on the first signal SIG1 and the second signal SIG2. In some implementations, the third circuit 313 may output a signal having a certain logic value from among the first signal SIG1 and the second signal SIG2. For example, the third circuit 313 may be implemented as a logical OR operator, may perform a logical OR operation on the first signal SIG1 and the second signal SIG2, and may produce a result of the logical OR operation. In this case, the wake-up signal WU may be a signal having a logic high level. In some implementations, the third circuit 313 is omitted.

The USB circuit 320 may generate the first enable signal EN1 based on a state in which the USB Type-C connector 30 and the external USB Type-C connector (e.g., the connector 111) are disconnected from each other. For example, the USB circuit 320 may generate a first enable signal EN1 having a first enable level by using a charging voltage of the battery 123 while the USB Type-C connector 30 and the external USB Type-C connector are disconnected from each other.

The USB circuit 320 may generate a second enable signal EN2 in response to the wake-up signal WU. For example, the USB circuit 320 may generate a second enable signal EN2 having a second enable level in response to the logic high level of the wake-up signal WU.

When the USB Type-C connector 30 and the external USB Type-C connector are connected to each other and a connection state is identified, the USB circuit 320 may charge the battery 123 based on a situation related to the connection of the USB Type-C connector 30. For example, the USB circuit 320 may charge the battery 123 based on a bus voltage supplied from the bus voltage pins (e.g., A4 and B4 or A9 and B9 in FIG. 2). For example, the USB circuit 320 may also charge the battery 123 based on a signal supplied through the first CC pin 31 and/or the second CC pin 32. The operation of charging the battery 123 based on a signal input through a CC pin may correspond to USB PD.

The OVP circuit 330 may restrict an overvoltage generated at the first CC pin 31 and/or the second CC pin 32. For example, when an overvoltage occurs at the first CC pin 31 and/or the second CC pin 32, the OVP circuit 330 may restrict the overvoltage at the CC pin by blocking the connection between a CC pin where the overvoltage has occurred and the CC circuit 340. In some implementations, the OVP circuit 330 is deactivated when the electronic device is in a sleep state or when the connectors are disconnected from each other. In this case, when the OVP circuit 330 is deactivated, the first and second CC pins 31 and 32 and the CC circuit 340 are electrically disconnected, and thus, an overvoltage at the CC pin may be restricted. In some implementations, the OVP circuit 330 is activated in response to the second enable signal EN2. For example, the OVP circuit 330 may have a state in which the OVP circuit 330 may perform an overvoltage restriction operation for restricting an overvoltage at one or more CC pins (e.g., at least one of the first CC pin 31 and the second CC pin 32) in a first activation state in response to the second enable level of the second enable signal EN2. The activated OVP circuit 330 may monitor a voltage generated at the first CC pin 31 and/or the second CC pin 32, and may disconnect the connection between a CC pin where the overvoltage has occurred and the CC circuit 340 when a voltage higher than a predetermined level is monitored. The first activation state can refer to the state when the OVP circuit 330 is activated.

The CC circuit 340 may be activated in response to the second enable signal EN2. For example, the CC circuit 340 may identify a situation related to the connection of the USB Type-C connector 30 based on a CC signal in a second activation state, in response to the second enable level of the second enable signal EN2. The second activation state can refer to the state when the CC circuit 340 is activated.

In some implementations, the CC circuit 340 detects the insertion/disconnection of the USB Type-C connector 30, detects a plug insertion direction, and identifies a connector connection mode, based on signals recognized from the CC pins A5 and B5. The CC circuit 340 may recognize a situation related to the USB Type-C connector 30 based on a signal input through at least one of the first CC pin 31 and the second CC pin 32 and may transmit the recognized situation to the USB circuit 320 and the application processor 124. For example, the CC circuit 340 may perform a pull-up operation by using a pull-up resistor Rp connected to any one CC pin. The pull-up resistor Rp may be replaced with a current source.

In some implementations, the CC circuit 340 determines a host role and device role for providing power through a USB PD protocol that allows the host (or DFP) to provide the most power to the device (or UFP) from signals recognized at the first CC pin 31 and the second CC pin 32. For example, the CC circuit 340 may perform PD communication through the first CC pin 31 and the second CC pin 32 and may exchange power information between connected electronic devices. The CC circuit 340 may exchange power information and transfer power through the first CC pin 31 and the second CC pin 32 based on a bi-phase mark code (BMC).

In some implementations, the CC circuit 340 determines whether the connectors 111 and 121 are disconnected from each other based on a CC signal of at least one of the first CC pin 31 and the second CC pin 32. When the connectors 111 and 121 are disconnected from each other, the CC circuit 340 may output a disconnection notification signal DTCH. The disconnection notification signal DTCH may be a signal that notifies that the connectors 111 and 121 are disconnected from each other. In some implementations, the disconnection notification signal DTCH may be a pulse signal.

In some implementations, the CC circuit 340 determines a USB Type-C capacity to be a certain value (e.g., 1.5 A or 3 A) based on resistance values recognized at the first CC pin 31 and the second CC pin 32.

According to the implementations described above, by deactivating the OVP circuit 330 and the CC circuit 340 when the USB Type-C connector 30 is disconnected from the external connector, the efficiency of the battery 123 may be optimized, the power consumption of the battery 1230 may be reduced, and the usage time of the device may be secured.

In addition, by blocking the connection between the first and second CC pins 31 and 32 and internal circuits while the USB Type-C connector 30 is disconnected from the external connector, it can restrict overvoltage at the first CC pin 31 and the second CC pin 32 and thus reduce damage to the device.

FIG. 4 is a block diagram showing an example of a circuit 400 connected to a CC pin 40. Referring to FIG. 4, the circuit 400 may include an input signal generation circuit 410, a swing range change circuit 420, a CC phase detection circuit 430, and a clock generation circuit 440. The circuit 400 of FIG. 4 may correspond to the first circuit 311 or the second circuit 312 in FIG. 3. For example, when the circuit 400 of FIG. 4 is the first circuit 311 in FIG. 3, the CC pin 40 may be the first CC pin 31 in FIG. 3. For example, when the circuit 400 of FIG. 4 is the second circuit 312 in FIG. 3, the CC pin 40 may be the second CC pin 32 in FIG. 3.

Figure 5:
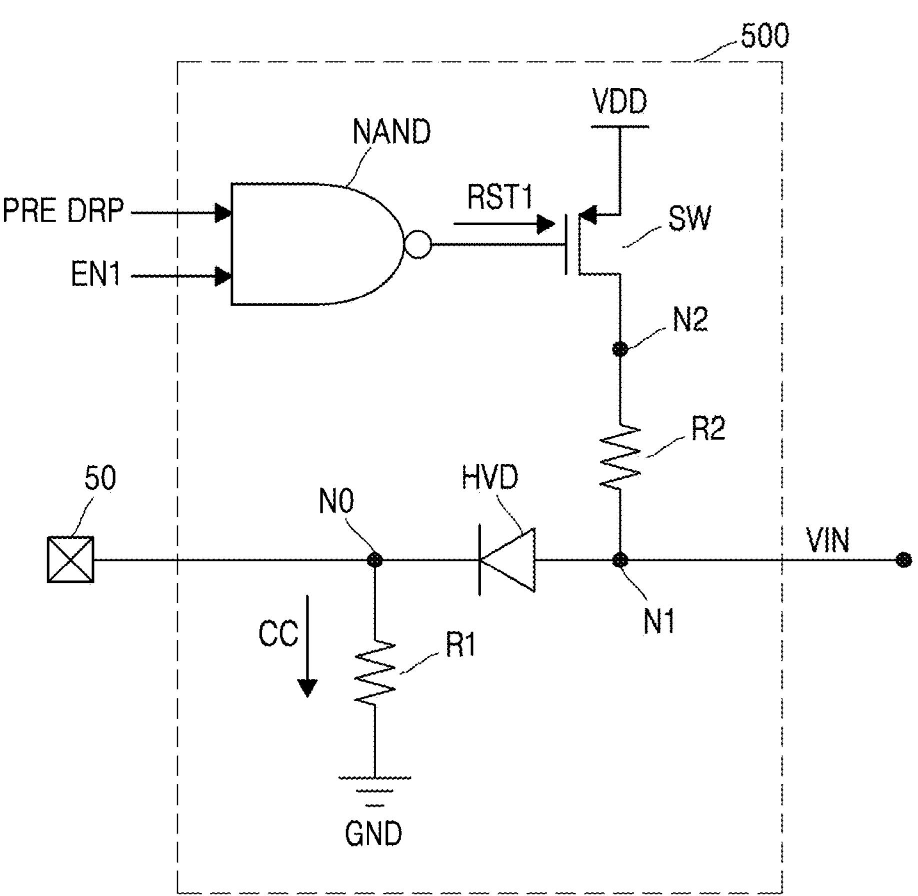
FIG. 5 is a circuit diagram showing an example of an input signal generation circuit.

The input signal generation circuit 410 may apply a CC signal (not shown) to the CC pin 40 based on a first enable signal EN1 and a pre-DRP signal PRE DRP and may apply an input signal VIN having a magnitude greater than the magnitude of the CC signal to a first node N1 (see FIG. 5). The input signal VIN may be, for example, a voltage.

The swing range change circuit 420 may change the swing range of the input signal VIN to a range from a first supply voltage VSPL1 to a second supply voltage VSPL2. At least one of the first supply voltage VSPL1 and the second supply voltage VSPL2 may be a voltage generated based on the charging voltage of the battery 123. For example, the first supply voltage VSPL1 may be a supply voltage VDD (see FIG. 5) regulated from the charging voltage of the battery 123, and the second supply voltage VSPL2 may be a ground voltage GND (see FIG. 5) of the ground. However, the disclosure is not limited to the above-described examples. In some implementations, the swing range change circuit 420 changes the swing range of the input signal VIN so that the highest level of the input signal VIN is the level of the first supply voltage VSPL1 and the lowest level of the input signal VIN is the level of the second supply voltage VSPL2. The swing range change circuit 420 may generate an output signal VOUT having a changed swing range.

The CC phase detection circuit 430 may receive the first enable signal EN1 and a first internal clock signal ICLK1. The CC phase detection circuit 430 may receive a first enable level of the first enable signal EN1 and generate a pre-DRP signal PRE DRP having a frequency lower than the frequency of the first internal clock signal ICLK1. The CC phase detection circuit 430 may count clock cycles of the first internal clock signal ICLK1 during a counting period corresponding to a phase difference between the pre-DRP signal PRE DRP and the output signal VOUT. The CC phase detection circuit 430 may generate a pulse signal PSIG corresponding to the wake-up signal WU (see FIG. 3) based on a count value and a reference count value. The pulse signal PSIG may correspond to the first signal SIG1 or the second signal SIG2 in FIG. 3.

The clock generation circuit 440 may generate the first internal clock signal ICLK1 based on the charging voltage of the battery 123. In some implementations, the clock generation circuit 440 may generate the first internal clock signal ICLK1 by using a voltage charged in the battery 123 while the second electronic device 120 is turned on.

In some implementations, the first circuit 311 includes a first input signal generation circuit, a first swing range change circuit, a first CC phase detection circuit, and a first clock generation circuit, and the second circuit 312 includes a second input signal generation circuit, a second swing range change circuit, a second CC phase detection circuit, and a second clock generation circuit. The first and second clock generation circuits 311 and 312 according to some implementations may be integrated into one clock generation circuit 440. In some implementations, the integrated clock generation circuit 440 may be designed external to the first circuit 311 and the second circuit 312.

FIG. 5 is a circuit diagram showing an example of an input signal generation circuit 500. Referring to FIG. 5, the input signal generation circuit 500 may correspond to the input signal generation circuit 410 in FIG. 4. The input signal generation circuit 500 may include a first resistor R1, a diode HVD, a second resistor R2, a NAND operator NAND, and a switch SW.

The first resistor R1 may be connected to a second line to which a second supply voltage VSPL2 is applied and a CC pin 50, and may have a first resistance. In some implementations, the second line to which the second supply voltage VSPL2 is applied may correspond to the ground GND. For example, the first resistor R1 may be connected to a node N0 and the ground, and the CC pin 50 may be connected to the node N0.

The diode HVD may have an anode connected to a first node N1, and a cathode connected to the node N0 and the CC pin 50. The diode HVD may allow current to flow in a direction from the first node N1 to the node N0. In some implementations, the diode HVD may be implemented as a high voltage diode.

The second resistor R2 may be connected to the first node N1 and a second node N2 and may have a second resistance. The second resistance can be smaller than the first resistance. In some implementations, the smaller the second resistance is than the first resistance, the larger the magnitude (e.g., the voltage level) of the input signal VIN applied to the first node N1.

The NAND operator NAND may perform a NAND logic operation on the logic value (or logic level) of the first enable signal EN1 and the logic value of the pre-DRP signal PRE DRP, and may generate a first operation result signal RST1 indicating the result of the NAND logic operation. For example, when the logic value of the first enable signal EN1 and the logic value of the pre-DRP signal PRE DRP are both at a logic high level, the logic value of the first operation result signal RST1 is at a logic low level. When at least one of the logic value of the first enable signal EN1 and the logic value of the pre-DRP signal PRE DRP is at a logic low level, the logic value of the first operation result signal RST1 is at a logic high level.

The switch SW may be connected between a first line supplied with a first supply voltage VSPL1 and the second node N2, and may transfer the first supply voltage VSPL1 to the second node N2 based on the first operation result signal RST1. In some implementations, the first supply voltage VSPL1 is a supply voltage VDD and regulated based on a voltage charged in the battery 123. In some implementations, the switch SW is implemented as a P-type transistor. The P-type transistor may have a gate electrode receiving the first operation result signal RST1, a first electrode (e.g., a source) to which the supply voltage VDD is applied, and a second electrode (e.g., a drain) connected to the second node N2, and may transfer the supply voltage VDD to the second node N2 based on the first operation result signal RST1. In some implementations, when the switch SW is turned on, a current path may be formed by the supply voltage VDD, the switch SW, the second resistor R2, the diode HVD, and the first resistor R1.

Figure 6:
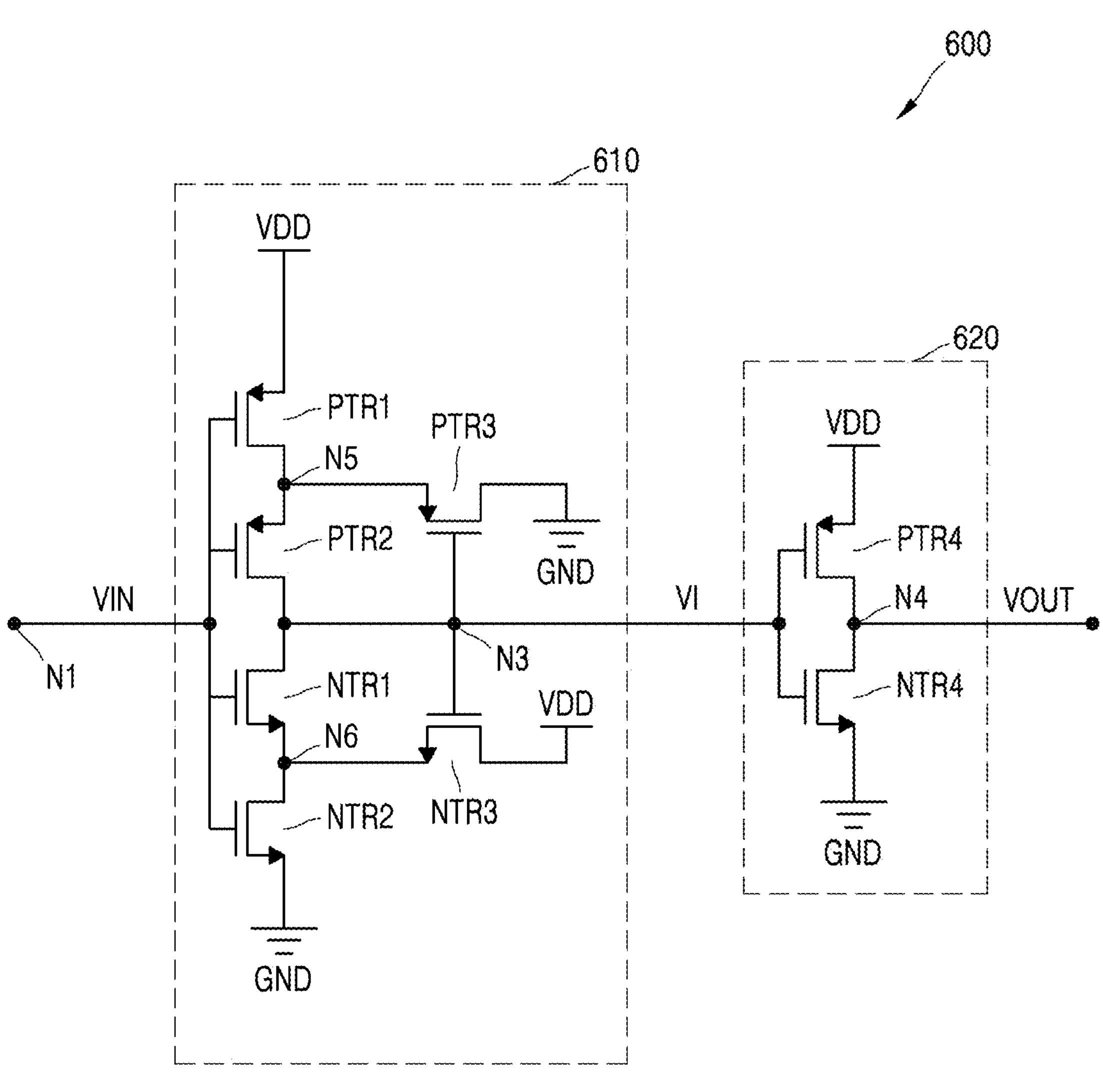
FIG. 6 is a circuit diagram showing an example of a swing range change circuit.

FIG. 6 is a circuit diagram showing an example of a swing range change circuit 600. In some implementations, the swing range change circuit 600 can be used for the swing range change circuit 420 of FIG. 4. Referring to FIG. 6, in some implementations, the swing range change circuit 600 is implemented as a Schmitt trigger circuit. The Schmitt trigger circuit can be a type of comparator having hysteresis, that is, a type of bistable multivibrator having two stable output states. The Schmitt trigger circuit according to some implementations may include a Schmitt trigger 610 and an inverter 620.

The Schmitt trigger 610 may be connected to a first node N1 and a third node N3, and may be configured to swing a level of an input signal VIN applied to the first node N1 to a level of a first supply voltage VSPL1 or a level of a second supply voltage VSPL2 lower than the first supply voltage VSPL1. For example, the first supply voltage VSPL1 may be the supply voltage VDD, and the second supply voltage VSPL2 may be the ground voltage GND. An amplified input signal VI may be applied to the third node N3.

In some implementations, the Schmitt trigger 610 may include first to third P-type transistors PTR1, PTR2, and PTR3 and first to third N-type transistors NTR1, NTR2, and NTR3. The Schmitt trigger 610 in FIG. 6 may be referred to as a Schmitt trigger inverter.

The first and second P-type transistors PTR1 and PTR2 and the first and second N-type transistors NTR1 and NTR2 may respectively have gate electrodes commonly connected to the first node N1. The third P-type transistor PTR3 and the third N-type transistor NTR3 may respectively have gate electrodes commonly connected to the third node N3.

The first P-type transistor PTR1 may include a first electrode connected to a first line to which the supply voltage VDD is supplied, and a second electrode connected to a fifth node N5. The second P-type transistor PTR2 may include a first electrode connected to the fifth node N5 and a second electrode connected to the third node N3. The third P-type transistor PTR3 may include a first electrode connected to the fifth node N5 and a second electrode connected to a second line (or the ground) to which the ground voltage GND is applied. For example, the first electrodes of the first to third P-type transistors PTR1, PTR2, and PTR3 may be sources, and the second electrodes of the first to third P-type transistors PTR1, PTR2, and PTR3 may be drains.

The first N-type transistor NTR1 may include a first electrode connected to a sixth node N6 and a second electrode connected to the third node N3. The second N-type transistor NTR2 may include a first electrode connected to the second line and a second electrode connected to the sixth node N6. The third N-type transistor NTR3 may include a first electrode connected to the sixth node N6 and a second electrode connected to the first line. For example, the first electrode of each of the first to third N-type transistors NTR1, NTR2, and NTR3) may be a source, and the second electrode of each of the first to third N-type transistors NTR1, NTR2, and NTR3 may be a drain.

The inverter 620 may be connected to the third node N3 and the fourth node N4, may invert the level of the amplified input signal VI applied to the third node N3, based on the first supply voltage VSPL1 (e.g., VDD) and the second supply voltage VSPL2 (e.g., GND), and may output an output signal VOUT corresponding to the inverted input signal. The output signal VOUT may be applied to the fourth node N4.

In some implementations, the inverter 620 includes a fourth P-type transistor PTR4 and a fourth N-type transistor NTR4. The fourth P-type transistor PTR4 and the fourth N-type transistor NTR4 may respectively have gate electrodes commonly connected to the third node N3. The fourth P-type transistor PTR4 may include a first electrode connected to the first line to which the supply voltage VDD is transmitted, and a second electrode connected to the fourth node N4. The fourth N-type transistor NTR4 may include a first electrode connected to the second line (e.g., the ground) and a second electrode connected to the fourth node N4. The first electrodes of the fourth P-type transistor PTR4 and the fourth N-type transistor NTR4 may be sources, and the second electrodes of the fourth P-type transistor PTR4 and the fourth N-type transistor NTR4 may be drains.

Figure 7:
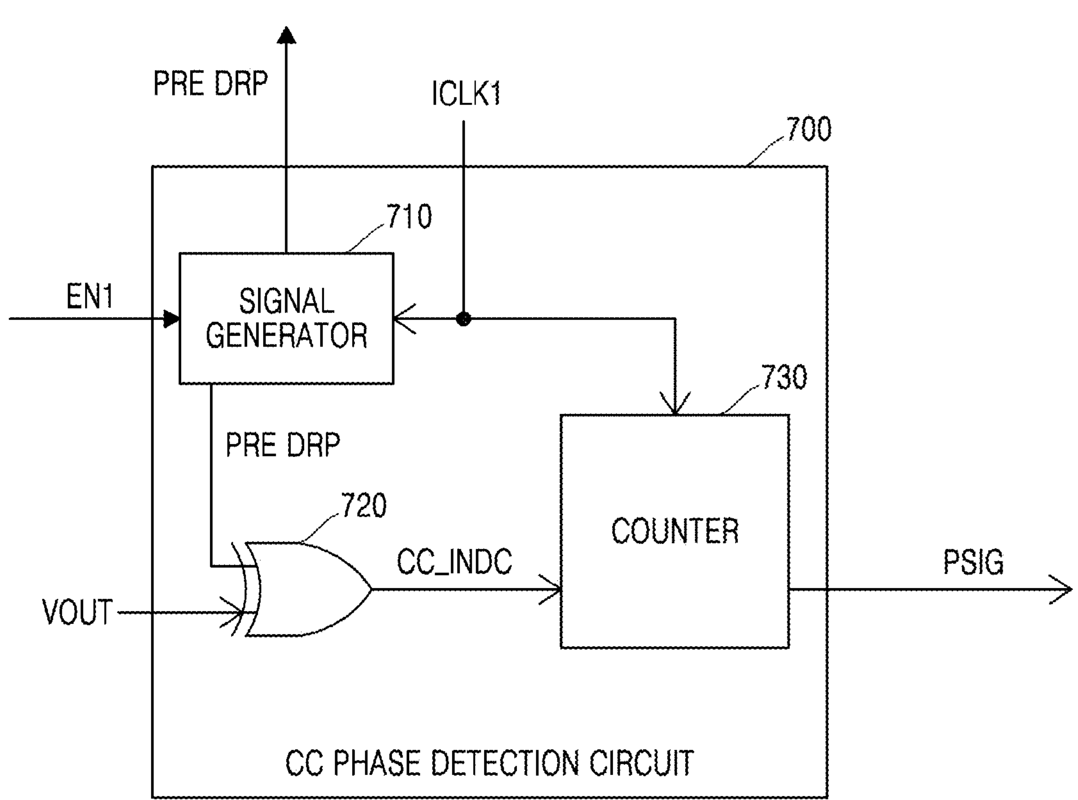
FIG. 7 is a circuit diagram showing an example of a CC phase detection circuit.

FIG. 7 is a circuit diagram showing an example of a CC phase detection circuit 700. In some implementations, the CC phase detection circuit 700 can be used for the CC phase detection circuit 430 of FIG. 4. Referring to FIG. 7, the CC phase detection circuit 700 may include a signal generator 710, an exclusive OR generator 720, and a counter 730.

The signal generator 710 may receive a first enable level of the first enable signal EN1 and generate a toggled pre-DRP signal PRE DRP based on the first internal clock signal ICLK1. In some implementations, the first enable level may be a logic high level, but the disclosure is not limited to the aforementioned implementations. The signal generator 710 may receive a first disable level of the first enable signal EN1 and stop generating the toggled pre-DRP signal PRE DRP.

The exclusive OR generator 720 may perform an exclusive OR operation on the logic value of the output signal VOUT and the logic value of the pre-DRP signal PRE DRP. The exclusive OR generator 720 may generate a second operation result signal CC_INDC indicating the result of the exclusive OR operation. The second operation result signal CC_INDC may be provided to the counter 730. A section in which the second operation result signal CC_INDC has a certain logic value may occur, and the section in which the second operation result signal CC_INDC has a certain logic value may correspond to the counting period described above. In some implementations, the certain logic value of the second operation result signal CC_INDC may be a logic high level, but the disclosure is not limited to the aforementioned implementations.

The counter 730 may count clock cycles of the first internal clock signal ICLK1 during the counting period. The clock cycle of the first internal clock signal ICLK1 may refer to a signal occurring within one cycle. For example, when the clock cycle occurs three times during the counting period, the count value may be "3". The counter 730 may generate a pulse signal PSIG having a pulse width based on whether the count value is greater than or equal to a reference count value.

Figure 8:
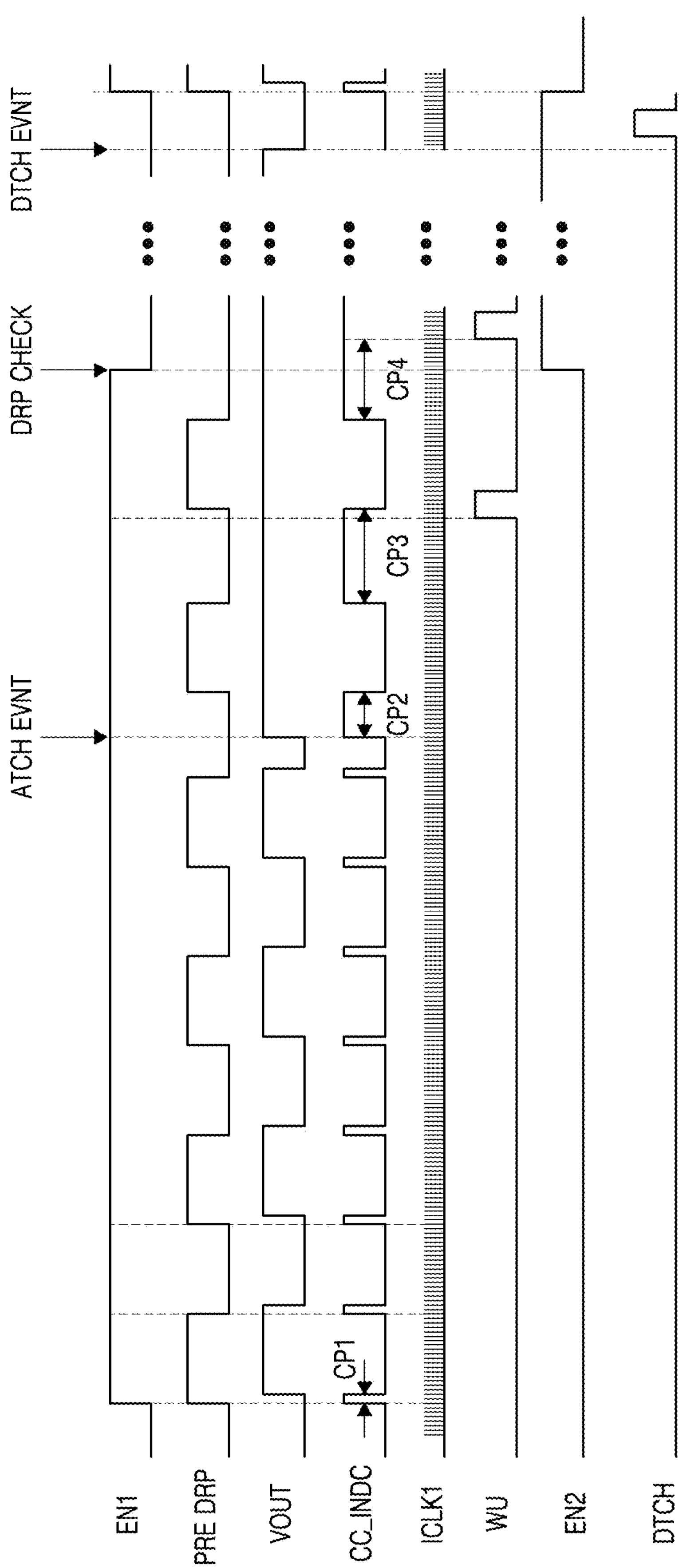
FIG. 8 is a timing diagram of signals of a USB interface circuit.

FIG. 8 is a timing diagram of signals of a USB interface circuit according to some implementations. In some implementations, the USB interface circuit can be used for the USB interface circuit 300 of FIG. 3. Referring to FIG. 1 and FIGS. 5 to 8, when the first electronic device 110 and the second electronic device 120 are disconnected from each other and the second electronic device 120 is in a sleep state, the logic value of the first enable signal EN1 may have a first enable level. For example, the first enable level may be a logic high level. In addition, when the logic value of the first enable signal EN1 is at a logic high level, the pre-DRP signal PRE DRP may be toggled. The frequency of the toggled pre-DRP signal PRE DRP may be less than the frequency of the first internal clock signal ICLK1. The frequency of the pre-DRP signal PRE DRP may be less than the frequency of the first internal clock signal ICLK1. After the pre-DRP signal PRE DRP is toggled, when the logic value of each of the pre-DRP signal PRE DRP and the first enable signal EN1 is at a logic high level, the switch SW (e.g., SW of FIG. 5) may be turned on, and when any one of the pre-DRP signal PRE DRP and the first enable signal EN1 is at a logic low level, the switch SW may be turned off. The switch SW may be turned on or off alternately as the pre-DRP signal PRE DRP is toggled. When the switch SW is turned on, the supply voltage VDD is transferred to the second node N2 and the output signal VOUT may be generated. As the pre-DRP signal PRE DRP toggles, the output signal VOUT may also toggle. When the logic values of the pre-DRP signal PRE DRP and the output signal VOUT are different from each other, the second operation result signal CC_INDC (FIG. 7) may have a logic high level. That is, during a section in which a phase difference between the pre-DRP signal PRE DRP and the output signal VOUT occurs, the second operation result signal CC_INDC having a pulse width may be generated. The pulse width of the second operation result signal CC_INDC may correspond to the counting period. During a section in which the second operation result signal CC_INDC has a logic high level, clock cycles of the first internal clock signal ICLK1 may be counted. When the pulse width of the second operation result signal CC_INDC is relatively small, the count value for the first internal clock signal ICLK1 may be less than the reference count value. Therefore, the pulse signal PSIG may not be generated, and the pulse of the wake-up signal WU may not be generated. For example, the count value for the first internal clock signal ICLK1 counted during a first counting period CP1 may be less than the reference count value.

At some point, an attachment event ATCH EVNT may occur. The attachment event ATCH EVNT means that the first electronic device 110 (e.g., a charger) and the second electronic device 120 are electrically connected to each other via the USB Type-C cable 130. In this case, a CC signal CC may be generated from one or more CC pins 40 or 50 of the first and second CC pins 31 and 32, and the output signal VOUT may have a logic high level. A section in which the second operation result signal CC_INDC has a logic high level may gradually increase. In a certain section in which the second operation result signal CC_INDC has a logic high level, the count value for the first internal clock signal ICLK1 may be greater than or equal to the reference count value. In this case, a pulse signal PSIG may be generated, and a wake-up signal WU having a pulse width of a logic high level may be generated. For example, a count value for the first internal clock signal ICLK1 counted during a second counting period CP2 may be less than the reference count value, and a count value for the first internal clock signal ICLK1 counted during at least a portion of a third counting period CP3 may be greater than or equal to the reference count value. In some implementations, the wake-up signal WU is repeatedly generated whenever the count value for the first internal clock signal ICLK1 is greater than or equal to the reference count value. For example, even in a fourth counting period CP4 after the third counting period CP3, the count value for the first internal clock signal ICLK1 may be greater than or equal to the reference count value.

After the wake-up signal WU first occurs, the logic value of the first enable signal EN1 may be at a first disable level (e.g., a logic low level). As the generation of the toggled pre-DRP signal PRE DRP is stopped, the pre-DRP signal PRE DRP may have a logic low level. The output signal VOUT may maintain a logic high level. The logic value of the second enable signal EN2 may be at a second enable level (e.g., a logic high level). In this case, the OVP circuit 330 and the CC circuit 340 may be activated. The CC circuit 340 may check whether a DRP is present (DRP CHECK). The checking whether a DRP is present (DRP CHECK) may be checking the connection state of connectors. For example, the CC circuit 340 may check whether an external electronic device (e.g., the electronic device 110) is a DFP or a UFP. For example, when the first electronic device 110 is a source that provides a supply voltage, such as a charger, the first electronic device 110 may be a DFP and the second electronic device 120 may be a UFP. However, the disclosure is not limited to the aforementioned example. After whether a DRP is present (DRP CHECK) is checked, the second electronic device 120 may enter an operation mode and perform an operation.

A detachment event DTCH EVNT may occur. The detachment event DTCH EVNT means that the first electronic device 110 and the second electronic device 120 are disconnected from each other. The CC circuit 340 may detect whether the connectors are detached and generate a pulse of the disconnection notification signal DTCH. After the disconnection notification signal DTCH is generated, the logic value of the second enable signal EN2 may have a second disable level (e.g., a logic low level). In some implementations, the first enable signal EN1 may have a logic high level in synchronization with the logic low level of the second enable signal EN2. However, the disclosure is not limited to the aforementioned implementations, and in some implementations, after a certain time has passed since the second enable signal EN2 has a logic low level, the first enable signal EN1 may have a logic high level when the second electronic device 120 is in a sleep state.

FIG. 9 is a block diagram showing another example of a USB interface circuit according to some implementations. Referring to FIG. 9, a USB interface circuit 900 may be connected to a USB Type-C connector 90. For example, the USB interface circuit 900 may be connected to a first CC pin 91, a second CC pin 92, and a bus voltage pin 93 of the USB Type-C connector 90. The USB interface circuit 900 may include a wake-up circuit 910, a USB circuit 920, an OVP circuit 930, and a CC circuit 940, as described above with reference to FIG. 3.

The wake-up circuit 910 may include a first circuit 911, a second circuit 912, and a third circuit 913. The first circuit 911, the second circuit 912, and the third circuit 913 are as described above with reference to FIG. 3. In some implementations, the wake-up circuit 910 may further include a fourth circuit 914.

The fourth circuit 914 may be connected to the bus voltage pin 93 and may change the swing range of a bus voltage VBUS applied to the bus voltage pin 93 to a range from the first supply voltage VSPL1 to the second supply voltage VSPL2. In some implementations, the first supply voltage VSPL1 may be the supply voltage VDD, and the second supply voltage VSPL2 may be the ground voltage GND. The fourth circuit 914 may output, as a third signal SIG3, an output voltage having the changed swing range.

The third circuit 913 in FIG. 9 may output, as a wake-up signal WU, a signal having a certain logic value from among first and second signals SIG 1 and SIG 2 each corresponding to a pulse signal, and the third signal SIG3 corresponding to the output voltage. Referring to FIGS. 8 and 9, for example, a signal having a logic high level from among the first to third signals SIG1, SIG2, and SIG3 may be transmitted to the USB circuit 920 as the wake-up signal WU. The third circuit 913 in FIG. 9 may be referred to as a transmission circuit in the present disclosure.

Figure 10:
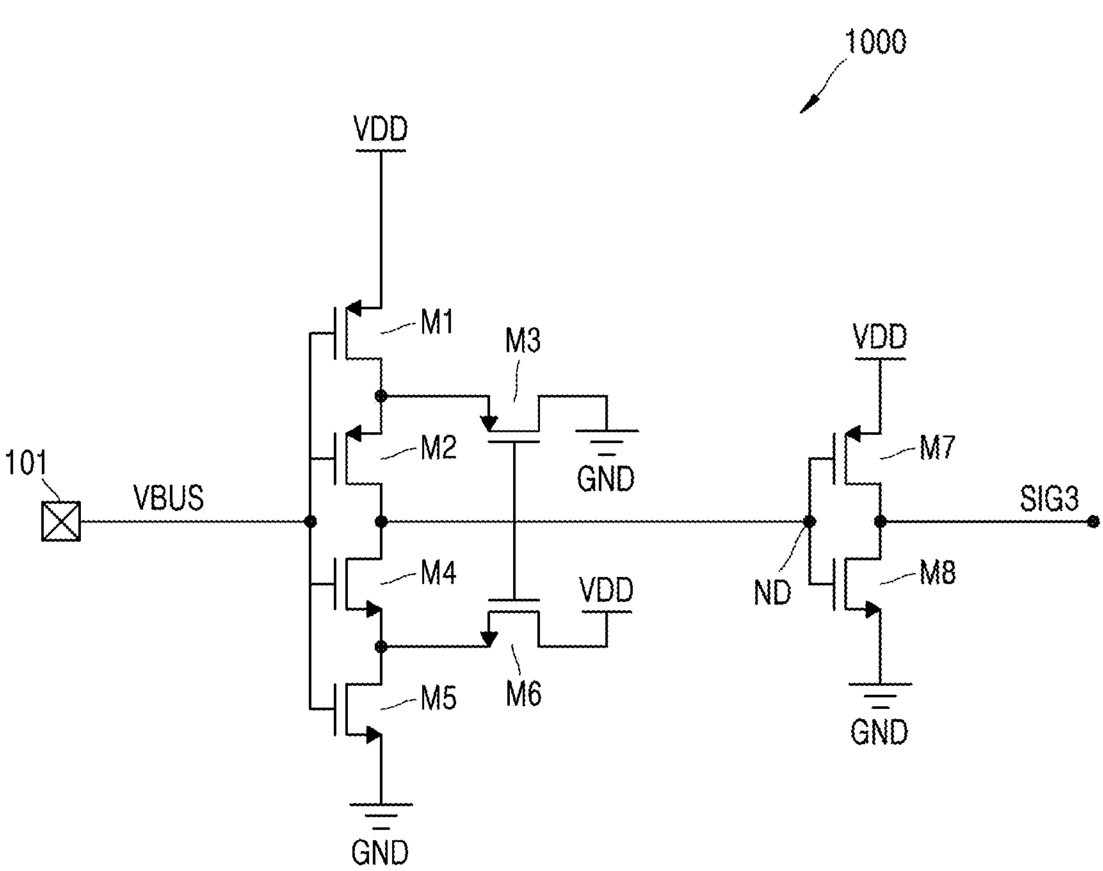
FIG. 10 is a circuit diagram showing an example of a fourth circuit in FIG. 9.

FIG. 10 is a circuit diagram showing an example of a fourth circuit in FIG. 9. Referring to FIG. 10, in some implementations, a fourth circuit 1000 may be implemented as a Schmitt trigger circuit, like the swing range change circuit 600 in FIG. 6. For example, the fourth circuit 1000 may include first to eighth transistors M1, M2, M3, M4, M5, M6, M7, and M8. The gate electrodes of the first, second, fourth, and fifth transistors M1, M2, M4, and M5 may be commonly connected to a bus voltage pin 101. The gate electrodes of the third, sixth, seventh, and eighth transistors M3, M6, M7, and M8 may be commonly connected to a node ND. The first to third transistors M1, M2, and M3 may be identical to the first to third P-type transistors PTR1, PTR2, and PTR3 in FIG. 6. The fourth to sixth transistors M4, M5, and M6 may be identical to the first to third N-type transistors NTR1, NTR2, and NTR3 in FIG. 6. The seventh transistor M7 may be identical to the fourth P-type transistor PTR4 in FIG. 6. The eighth transistor M8 may be identical to the fourth N-type transistor NTR4 in FIG. 6.

FIG. 11 is a block diagram showing another example of a USB interface circuit according to some implementations. Referring to FIG. 11, a USB interface circuit 1100 may include a first input signal generator 1111, a first Schmitt trigger circuit 1112, a first CC phase detector 1113, a second input signal generator 1121, a second Schmitt trigger circuit 1122, a second CC phase detector 1123, a third Schmitt trigger circuit 1130, a logical OR operator 1140, an interface power management integrated circuit (PMIC) 1150, an over-voltage protector 1160, a first plug detector 1171, a second plug detector 1172, and a first internal clock source 1180.

Each of the first input signal generator 1111 and the second input signal generator 1121 may correspond to the input signal generation circuits 410 and 500 in FIGS. 4 and 5. The first input signal generator 1111 may receive a first pre-DRP signal PRE DRP1 and a first enable signal EN1 and may output a first input signal VIN1. The second input signal generator 1121 may receive a second pre-DRP signal PRE DRP2 and the first enable signal EN1 and may output a second input signal VIN2.

Each of the first Schmitt trigger circuit 1112 and the second Schmitt trigger circuit 1122 may correspond to the swing range change circuits 420 and 600 in FIGS. 4 and 6. The first Schmitt trigger circuit 1112 may receive the first input signal VIN1 and may output a first output signal VOUT1. The second Schmitt trigger circuit 1122 may receive the second input signal VIN2 and output a second output signal VOUT2.

Each of the first CC phase detector 1113 and the second CC phase detector 1123 may correspond to the CC phase detection circuits 430 and 700 in FIGS. 4 and 7. The first CC phase detector 1113 and the second CC phase detector 1123 may receive the first enable signal EN1. The first CC phase detector 1113 may receive the first output signal VOUT1 and output the first pre-DRP signal PRE DRP1 and a first digital signal. The second CC phase detector 1123 may receive the second output signal VOUT2 and output the second pre-DRP signal PRE DRP2 and a second digital signal.

The third Schmitt trigger circuit 1130 may correspond to the fourth circuit 1000 in FIG. 10. The third Schmitt trigger circuit 1130 may receive a bus voltage VBUS and output a third digital signal.

The logical OR operator 1140 may correspond to the third circuits 313 and 913 in FIGS. 3 and 9. The logical OR operator 1140 may receive the first to third digital signals and output, as a wake-up signal WU, a signal having a logic high level from among the first to third digital signals.

The interface PMIC 1150 may correspond to the USB circuits 320 and 920 in FIGS. 3 and 9. In some implementations, the interface PMIC 1150 may be a chip in which a micro controller unit (MCU) 1151, a USB Type-C circuit 1152, a second internal clock source 1153, and the like are integrated into a single integrated circuit (IC). However, the disclosure is not limited to the aforementioned implementations, and in some implementations, each of the MCU 1151, the USB Type-C circuit 1152, and the second internal clock source 1153 may be integrated into a separate IC. The MCU 1151 may control all operations of the interface PMIC 1150. The USB Type-C circuit 1152 may generate a first enable signal EN1 having a first disable level and a second enable signal EN2 having a second enable level in response to the wake-up signal WU. The USB Type-C circuit 1152 may generate a first enable signal EN1 having a first enable level and a second enable signal EN2 having a second disable level in response to at least one of the first disconnection notification signal DTCH1 and the second disconnection notification signal DTCH2. In some implementations, the USB Type-C circuit 1152 may include various circuits related to USB Type-C, such as a circuit for generating a reference voltage VREF, a circuit for generating a reference current, and a circuit for performing CC communication. The second internal clock source 1153 may generate a second internal clock signal when an electronic device (e.g., the second electronic device 120) is in an operating state or is connected to an external electronic device (e.g., the first electronic device 110) and receives power from the external electronic device.

The overvoltage protector 1160 may correspond to the OVP circuits 330 and 930 in FIGS. 3 and 9. The overvoltage protector 1160 may be connected to the first CC pin 1101, the second CC pin 1102, the first plug detector 1171, and the second plug detector 1172. The overvoltage protector 1160 may be activated in response to a second enable level of the second enable signal EN2.

In some implementations, the overvoltage protector 1160 may include an overvoltage detector 1161, a charge pump 1162, and a group of switches TR1, HVD1, TR2, and HVD2.

The overvoltage detector 1161 may detect an overvoltage at one or more CC pins based on a voltage generated at at least one of the first and second CC pins 1101 and 1102, the second enable signal EN2, and the reference voltage VREF, and may generate a detection result signal indicating a detection result. In some implementations, the overvoltage detector 1161 may include resistors connected in series between each CC pin 1101 or 1102 and the ground, a comparator for comparing a voltage applied to a node between the series-connected resistors to the reference voltage VREF, and a NAND operator for performing a NAND operation on the output of the comparator and the second enable signal EN2.

The charge pump 1162 may generate an amplified voltage that has a level higher than the level of a voltage generated at one or more CC pins based on a detection result signal of the overvoltage detector 1161, and may provide the amplified voltage to a gate electrode of a transistor connected to a CC pin to which an overvoltage is applied. For example, when an overvoltage occurs at the first CC pin 1101, the charge pump 1162 may generate an amplified voltage that is higher by a level of a gate-source voltage (e.g., Vgs) than the voltage level of the overvoltage, and may provide the amplified voltage to the gate of the first transistor TR1. However, the disclosure is not limited to the aforementioned example.

The switch group TR1, HVD1, TR2, and HVD2 may electrically connect one or more CC pins to the first plug detector 1171 and/or the second plug detector 1172 based on the amplified voltage. In some implementations, the switch group TR1, HVD1, TR2, and HVD2 may include a first high voltage diode HVD1, a first transistor TR1, a second high voltage diode HVD2, and a second transistor TR2. The first high voltage diode HVD1 and the first transistor TR1 may be connected in parallel between the first CC pin 1101 and the first plug detector 1171. The second high voltage diode HVD2 and the second transistor TR2 may be connected in parallel between the second CC pin 1102 and the second plug detector 1172. The anode of the first high voltage diode HVD1 may be connected to the first plug detector 1171, and the cathode of the first high voltage diode HVD1 may be connected to the first CC pin 1101. The anode of the second high voltage diode HVD2 may be connected to the second plug detector 1172, and the cathode of the second high voltage diode HVD2 may be connected to the second CC pin 1102. The gate electrode of each of the first and second transistors TR1 and TR2 may be connected to the charge pump 162. In some implementations, the first and second transistors TR1 and TR2 may be N-type transistors.

In some implementations, the first and second transistors TR1 and TR2 may be turned off when the first and second electronic devices 110 and 120 are disconnected from each other.

The first plug detector 1171 and the second plug detector 1172 may be included in the CC circuit 340 in FIG. 3. The first plug detector 1171 and the second plug detector 1172 may detect the status and characteristics (e.g., connection/disconnection of connectors and connection status related to the connectors) of plugs based on the CC signal of a corresponding CC pin in response to the second enable level of the second enable signal EN2. In some implementations, the first plug detector 1171 and/or the second plug detector 1172 may output the first disconnection notification signal DTCH1 and/or the second disconnection notification signal DCTCH2 when the connectors are disconnected from each other.

In some implementations, the USB Type-C circuit 1152 can generate a second enable signal EN2 having a second disable level in response to at least one of the first disconnection notification signal DTCH1 or the second disconnection notification signal DTCH2. In some implementations, the overvoltage protector 1160 can be disabled in response to the second enable EN2 with the second disable level.

Figure 12:
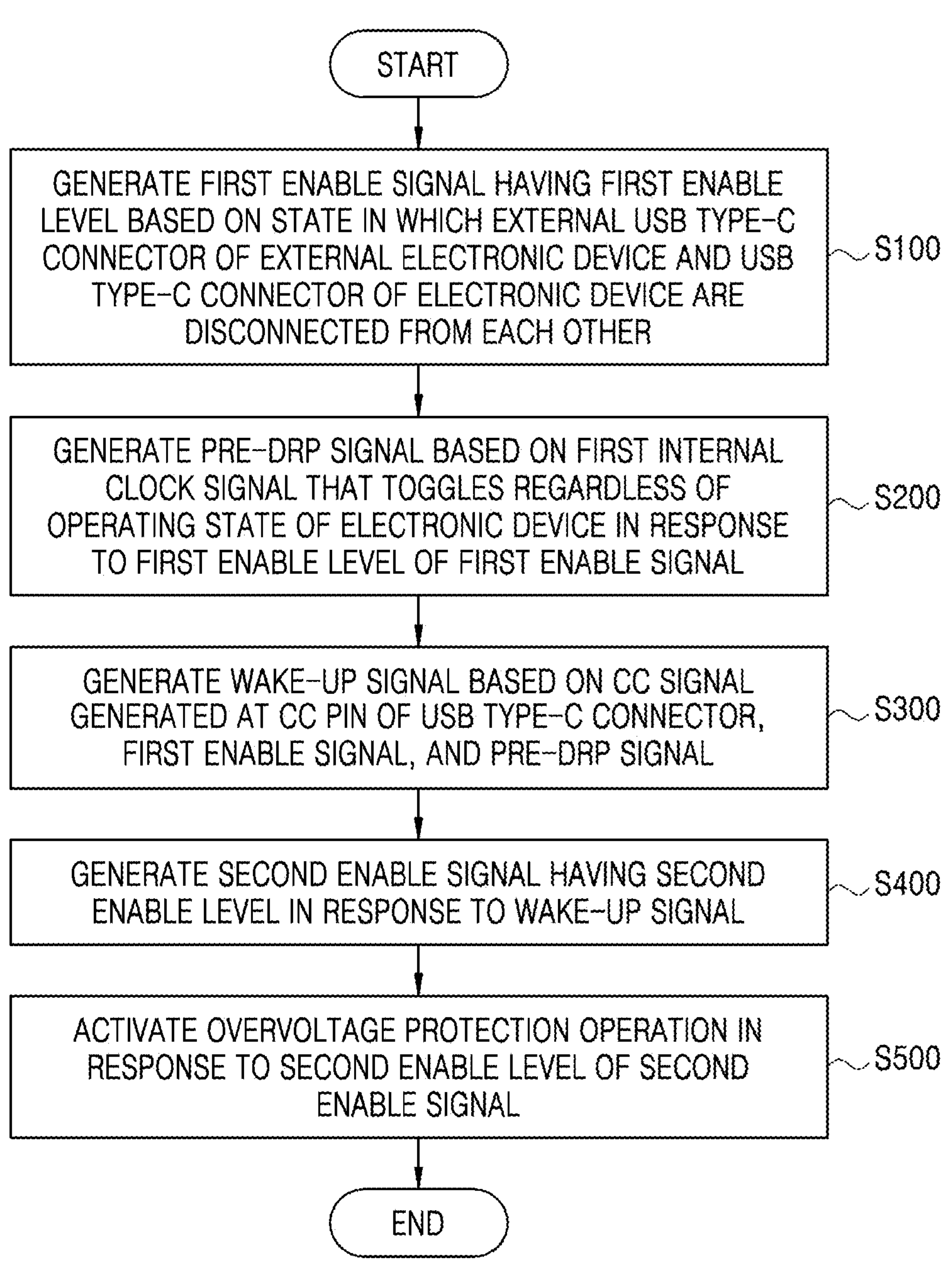
FIG. 12 is a flowchart illustrating an operating method of an electronic device.

FIG. 12 is a flowchart illustrating an operating method of an electronic device according to some implementations. Referring to FIG. 12, an electronic device performing the operating method of FIG. 12 may be an electronic device including a USB Type-C connector.

In operation S100, a USB circuit of the electronic device generates a first enable signal having a first enable level based on a state in which an external USB Type-C connector of an external electronic device and the USB Type-C connector of the electronic device are disconnected from each other.

In operation S200, a wake-up circuit of the electronic device generates a pre-DRP signal based on a first internal clock signal that toggles independent of an operating state of the electronic device in response to the first enable level of the first enable signal.

In operation S300, the wake-up circuit of the electronic device generates a wake-up signal that notifies a connection between the external USB Type-C connector and the USB Type-C connector based on a CC signal generated at a CC pin of the USB Type-C connector, the first enable signal, and the pre-DRP signal.

In some implementations for operation S300, operation S300 may include: generating, on the CC pin, an input signal having a magnitude greater than the magnitude of the CC signal based on the first enable signal and the pre-DRP signal; changing a swing range of the input signal to a range from a first supply voltage to a second supply voltage; counting clock cycles of the first internal clock signal during a counting period corresponding to a phase difference between an output signal whose swing range has been changed and the pre-DRP signal; and generating a wake-up signal based on a count value for the first internal clock signal and a reference count value. An implementations for operation S300 is as described above with reference to FIGS. 4 to 7.

In operation S400, the USB circuit of the electronic device generates a second enable signal having a second enable level in response to the wake-up signal.

In operation S500, an OVP circuit of the electronic device activates an overvoltage protection operation for restricting overvoltage at the CC pin in response to the second enable level of the second enable signal.

In some implementations, the operating method of the electronic device may further include generating, by a wake-up circuit, an output voltage having a changed swing range of a bus voltage based on the bus voltage generated at a bus voltage pin of the USB Type-C connector; and selecting, by the wake-up circuit, the output voltage as a wake-up signal.

In some implementations, the operating method of the electronic device may further include activating, by a CC circuit, a CC identification operation for identifying a situation related to the connection of the USB Type-C connector while the external USB Type-C connector and the USB Type-C connector are connected to each other, in response to the second enable level of the second enable signal. In addition, in some implementations, the operating method of the electronic device may further include performing, by a USB circuit, a battery charging operation, based on a supply voltage provided from an external electronic device, after the CC identification operation is completed.

In some implementations, the operating method of the electronic device may further include changing, by the USB circuit, the level of the first enable signal from a first enable level to a first disable level after the wake-up signal is generated, determining, by the CC circuit, whether the external USB Type-C connector and the USB Type-C connector are disconnected from each other, based on the CC signal of the CC pin, generating, by the CC circuit, a disconnection notification signal having an enable level based on a state in which the external USB Type-C connector and the USB Type-C connector are disconnected from each other, and changing, by the USB circuit, the level of the first enable signal from the first disable level to the first enable level in response to the disconnection notification signal.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

While the present disclosure has been particularly shown and described with reference to implementations thereof, it will be understood that various changes in form and details may be made therein without departing from the spirit and scope of the following claims. Therefore, the above examples should be considered illustrative.

What is claimed is:

1. An electronic device comprising:

a connector configured to be connected to an external connector of an external electronic device, the connector comprising a plurality of pins;

a wake-up circuit connected to configuration channel (CC) pins of the plurality of pins, the wake-up circuit being configured to (i) in response to a first enable signal, generate a pre-dual role port (DRP) signal based on a first internal clock signal that is toggled independent of an operating state of the electronic device, and (ii) generate a wake-up signal based on a CC signal generated at one or more CC pins of the CC pins, the first enable signal, the pre-DRP signal, and the first internal clock signal;

a universal serial bus (USB) circuit configured to generate the first enable signal while the connector and the external connector are disconnected from each other and to generate a second enable signal in response to the wake-up signal; and an overvoltage protection circuit connected to the CC pins, the overvoltage protection circuit being configured to enter an activation state from a deactivation state in response to the second enable signal and to perform an overvoltage protection operation for restricting overvoltage at the one or more CC pins while in the activation state.

2. The electronic device of claim 1, wherein the wake-up circuit comprises:

an input signal generation circuit configured to apply a first CC signal to a first CC pin of the CC pins and apply an input signal having a magnitude greater than a magnitude of the first CC signal to a first node, based on the first enable signal and the pre-DRP signal;

a swing range change circuit configured to change a swing range of the input signal to a swing range from a first supply voltage to a second supply voltage and to generate an output signal having the changed swing range;

a clock generation circuit configured to generate the first internal clock signal based on a charging voltage of a battery; and a CC phase detection circuit configured to receive the first enable signal with a first enable level and generate the pre-DRP signal having a frequency lower than a frequency of the first internal clock signal, to count clock cycles of the first internal clock signal during a counting period corresponding to a phase difference between the pre-DRP signal and the output signal, and to generate a pulse signal corresponding to the wake-up signal based on a count value of the first internal clock signal and a reference count value.

3. The electronic device of claim 2, wherein the input signal generation circuit comprises:

a first resistor connected to a second line to which the second supply voltage is applied and to the first CC pin;

a diode including an anode connected to the first node and a cathode connected to the first CC pin;

a second resistor connected to the first node and a second node and having a second resistance less than a first resistance of the first resistor;

a NAND operator configured to perform a NAND logic operation on a logic value of the first enable signal and a logic value of the pre-DRP signal and to generate a first operation result signal indicating a result of the NAND logic operation; and a switch including a gate electrode for receiving the first operation result signal and configured to transfer the first supply voltage to the second node based on the first operation result signal.

4. The electronic device of claim 2, wherein the swing range change circuit comprises:

a Schmitt trigger connected to the first node and a third node and configured to swing a level of the input signal to a level of the first supply voltage or a level of the second supply voltage that is lower than the level of the first supply voltage; and an inverter connected to the third node and a fourth node and configured to invert the level of the input signal amplified by the Schmitt trigger based on at least one of the first supply voltage or the second supply voltage and output an inverted input signal as the output signal.

5. The electronic device of claim 4, wherein the Schmitt trigger comprises:

a first P-type transistor including a gate electrode connected to the first node, a first terminal connected to a first line to which the first supply voltage is supplied, and a second terminal connected to a fifth node;

a second P-type transistor including a gate electrode connected to the first node, a first terminal connected to the fifth node, and a second terminal connected to the third node;

a third P-type transistor including a gate electrode connected to the third node, a first terminal connected to the fifth node, and a second terminal connected to a second line to which the second supply voltage is applied;

a first N-type transistor including a gate electrode connected to the first node, a first terminal connected to a sixth node, and a second terminal connected to the third node;

a second N-type transistor including a gate electrode connected to the first node, a first terminal connected to the second line, and a second terminal connected to the sixth node; and a third N-type transistor including a gate electrode connected to the third node, a first terminal connected to the sixth node, and a second terminal connected to the first line, and wherein the inverter comprises:

a fourth P-type transistor including a gate electrode connected to the third node, a first terminal connected to the first line, and a second terminal connected to the fourth node; and a fourth N-type transistor including a gate electrode connected to the third node, a first terminal connected to the second line to which the second supply voltage is applied, and a second terminal connected to the fourth node.

6. The electronic device of claim 2, wherein the CC phase detection circuit comprises:

a signal generator configured (i) to receive the first enable signal with the first enable level and generate the pre-DRP signal toggled based on the first internal clock signal, and (ii) to receive the first enable signal with a first disable level and stop generating the pre-DRP signal;

an exclusive OR operator configured to perform an exclusive OR operation on a logic value of the output signal and the logic value of the pre-DRP signal and to generate a second operation result signal indicating a result of the exclusive OR operation; and a counter configured to count clock cycles of the first internal clock signal during the counting period corresponding to a section in which the second operation result signal has a certain logic value and to generate the pulse signal having a pulse width based on whether the count value is greater than or equal to the reference count value.

7. The electronic device of claim 2, wherein the wake-up circuit further comprises:

a voltage swing change circuit connected to a bus voltage pin of the plurality of pins, the voltage swing change circuit being configured to change a swing range of a bus voltage applied to the bus voltage pin to a swing range from the first supply voltage to the second supply voltage and to generate an output voltage having the changed swing range; and a transmission circuit configured to output the output voltage having the changed swing range or the pulse signal as the wake-up signal.

8. The electronic device of claim 1, further comprising a CC circuit configured to enter the activation state from the deactivation state in response to the second enable signal and to identify a situation related to a connection of the connector based on a CC signal input through at least one of the CC pins while in the activation state.

9. The electronic device of claim 8, wherein the overvoltage protection circuit comprises:

an overvoltage detector configured to detect an overvoltage at one or more CC pins of the CC pins based on a voltage generated at the one or more CC pins, the second enable signal, and a reference voltage and to generate a detection result signal indicating a detection result;

a charge pump configured to, based on the detection result signal, generate an amplified voltage that has a level higher than a level of the voltage generated at the one or more CC pins; and a group of switches configured to electrically connect the one or more CC pins to the CC circuit based on the amplified voltage.

10. An operating method of an electronic device including a universal serial bus (USB) Type-C connector, the operating method comprising:

generating a first enable signal having a first enable level based on a state in which an external USB Type-C connector of an external electronic device and the USB Type-C connector are disconnected from each other;

generating a pre-dual role port (DRP) signal based on a first internal clock signal that toggles independent of an operating state of the electronic device in response to the first enable level of the first enable signal;

generating a wake-up signal indicating a connection between the external USB Type-C connector and the USB Type-C connector based on a configuration channel (CC) signal generated at a CC pin of the USB Type-C connector, the first enable signal, and the pre-DRP signal;

generating a second enable signal having a second enable level in response to the wake-up signal; and activating an overvoltage protection operation for restricting overvoltage at the CC pin in response to the second enable level of the second enable signal.

11. The operating method of claim 10, wherein the generating of the wake-up signal comprises:

generating, at the CC pin, an input signal having a magnitude greater than a magnitude of the CC signal based on the first enable signal and the pre-DRP signal;

changing a swing range of the input signal to a range from a first supply voltage to a second supply voltage;

counting clock cycles of the first internal clock signal during a counting period corresponding to a phase difference between an output signal whose swing range has been changed and the pre-DRP signal; and generating the wake-up signal based on a count value for the first internal clock signal and a reference count value.

12. The operating method of claim 10, further comprising:

generating an output voltage having a changed swing range of a bus voltage based on the bus voltage generated at a bus voltage pin of the USB Type-C connector; and selecting the output voltage as the wake-up signal.

13. The operating method of claim 10, further comprising activating a CC identification operation for identifying a situation related to a connection of the USB Type-C connector while the external USB Type-C connector and the USB Type-C connector are connected to each other, in response to the second enable level of the second enable signal.

14. The operating method of claim 13, further comprising performing a battery charging operation, based on a supply voltage provided from an external electronic device, after the CC identification operation is completed.

15. The operating method of claim 10, further comprising:

changing a level of the first enable signal from the first enable level to a first disable level after the wake-up signal is generated;

determining whether the external USB Type-C connector and the USB Type-C connector are disconnected from each other based on the CC signal of the CC pin;

generating a disconnection notification signal having an enable level based on a state in which the external USB Type-C connector and the USB Type-C connector are disconnected from each other; and changing the level of the first enable signal from the first disable level to the first enable level in response to the disconnection notification signal.

16. A universal serial bus (USB) interface circuit connected to a bus voltage pin, a first configuration channel (CC) pin, and a second CC pin of a USB Type-C connector, the USB interface circuit comprising:

a wake-up circuit configured to generate a pre-dual role port (DRP) signal based on a first internal clock signal that toggles independent of a connection state between the USB Type-C connector and an external USB Type-C connector in response to a first enable signal and to generate a wake-up signal based on a CC signal generated at one or more CC pins of the first CC pin and the second CC pin, the first enable signal, the pre-DRP signal, and the first internal clock signal;

an overvoltage protection circuit configured to be activated in response to a second enable signal and to perform an overvoltage protection operation for restricting overvoltage at the one or more CC pins;

a CC circuit configured to be activated in response to the second enable signal and to identify a situation related to a connection of the USB Type-C connector based on the CC signal; and a USB circuit configured to generate the first enable signal based on a state in which the USB Type-C connector and the external USB Type-C connector are disconnected from each other, to generate a second enable signal in response to the wake-up signal, and to charge a battery based on a situation related to a connection of the USB Type-C connector.

17. The USB interface circuit of claim 16, wherein the wake-up circuit comprises:

a first circuit connected to the first CC pin and configured to generate a first signal based on the first internal clock signal, the first enable signal, and a first CC signal of the first CC pin;

a second circuit connected to the second CC pin and configured to generate a second signal based on the first internal clock signal, the first enable signal, and a second CC signal of the second CC pin; and a third circuit configured to generate the wake-up signal based on the first signal and the second signal.

18. The USB interface circuit of claim 17, wherein the wake-up circuit further comprises a fourth circuit connected to the bus voltage pin of the USB Type-C connector and configured to generate a third signal swinging in a range from a supply voltage to a ground voltage based on a bus voltage applied to the bus voltage pin, and wherein the third circuit comprises a logical OR operator configured to perform a logical OR operation on a logic value of the first signal, a logic value of the second signal, and a logic value of the third signal and output a result of the logical OR operation as the wake-up signal.

19. The USB interface circuit of claim 17, wherein the first circuit comprises:

a first resistor connected to ground and the first CC pin and having a first resistance;

a first diode including an anode connected to a first node and a cathode connected to the first CC pin;

a second resistor connected to the first node and a second node and having a second resistance less than the first resistance;

a first NAND gate outputting a first NAND result signal indicating a result of a NAND operation on the pre-DRP signal and the first enable signal;

a first P-type transistor including a gate electrode receiving the first NAND result signal, a first terminal connected to a line to which a supply voltage is supplied, and a second terminal connected to the second node;

a first Schmitt trigger circuit connected to the first node and an output node, the first Schmitt trigger circuit being configured to change a swing level of a first input signal that is applied to the first node in a range from the supply voltage to a ground voltage of the ground and apply an output signal to the output node; and a first CC phase detection circuit configured to receive the first enable signal and generate the pre-DRP signal having a frequency lower than a frequency of the first internal clock signal, to count clock cycles of the first internal clock signal during a counting period corresponding to a phase difference between the pre-DRP signal and the output signal, and to generate the first signal based on a count value for the first internal clock signal and a reference count value.

20. The USB interface circuit of claim 19, wherein the first CC phase detection circuit comprises:

a signal generator configured to (i) receive the first enable signal with a first enable level and generate the pre-DRP signal toggled based on the first internal clock signal and (ii) to receive the first enable signal with a first disable level and stop generating the pre-DRP signal;

an exclusive OR operator configured to perform an exclusive OR operation on a logic value of the output signal and the logic value of the pre-DRP signal and to generate a second operation result signal indicating a result of the exclusive OR operation; and a counter configured to count clock cycles of the first internal clock signal during the counting period corresponding to a section in which the second operation result signal has a certain logic value and to generate the first signal having a pulse width based on whether the count value is greater than or equal to the reference count value.

* * * * *